United States Patent
Swaminathan et al.

(10) Patent No.: US 7,245,761 B2
(45) Date of Patent: Jul. 17, 2007

(54) METHOD AND APPARATUS FOR REDUCING DISTORTION IN IMAGES

(76) Inventors: Rahul Swaminathan, 423 W. 118th St., Apt. 2A, New York, NY (US) 10027; Michael Grossberg, 435 Riverside Dr., Apt. 114, New York, NY (US) 10025; Shree K. Nayar, 560 Riverside Dr., Apt. 15D, New York, NY (US) 10027

( * ) Notice: Subject to any disclaimer, the term of this patent is extended or adjusted under 35 U.S.C. 154(b) by 839 days.

(21) Appl. No.: 10/333,198

(22) PCT Filed: Jul. 23, 2001

(86) PCT No.: PCT/US01/23161
§ 371 (c)(1), (2), (4) Date: Aug. 1, 2003

(87) PCT Pub. No.: WO02/09036
PCT Pub. Date: Jan. 31, 2002

(65) Prior Publication Data
US 2004/0012544 A1 Jan. 22, 2004

Related U.S. Application Data

(60) Provisional application No. 60/220,024, filed on Jul. 21, 2000.

(51) Int. Cl.
*G06K 9/00* (2006.01)
*G06K 9/40* (2006.01)
*H04N 7/00* (2006.01)

(52) U.S. Cl. .......... 382/154; 382/275; 348/36

(58) Field of Classification Search .......... 382/154, 382/254, 275; 348/36, 143; 359/727; 345/32; 358/493
See application file for complete search history.

(56) References Cited

U.S. PATENT DOCUMENTS

| 5,760,826 | A | | 6/1998 | Nayar | 348/36 |
| 5,999,660 | A | * | 12/1999 | Zorin et al. | 382/276 |
| 6,198,852 | B1 | * | 3/2001 | Anandan et al. | 382/284 |
| 6,545,702 | B1 | * | 4/2003 | Konolige et al. | 348/36 |
| 6,870,563 | B1 | * | 3/2005 | Kang | 348/222.1 |

OTHER PUBLICATIONS

Geyer et al. Catadioptric Camera Calibration. The Proceedings of the Seventh IEEE International Conference on Computer Vision. Sep. 20-27, 1999, vol. 1, pp. 398-404.*
Derrien et al. (2000) "Approximating a Single Viewpoint in Panoramic Imaging Devices", IEEE International Conference on Robotics and Automation, vol. 4: 3931-3938.

* cited by examiner

*Primary Examiner*—Colin LaRose
(74) *Attorney, Agent, or Firm*—Baker Botts LLP

(57) ABSTRACT

An algorithm is provided for reducing distortion in an image captured by a camera or other imaging system having more than one optical viewpoint. The algorithm can use a captured image, statistical information regarding the depths of scene objects, and information regarding the geometrical characteristics of the imaging system to generate an approximation of a perspective projection representing the scene. The virtual viewpoint of the approximate perspective projection is selected so as to reduce distortion. The resulting image has less distortion than that of an image generated under an assumption that scene objects are infinitely distant. In addition, the parameters of any distortion reducing function can be optimized by minimizing an objective function representing the amount of image distortion.

39 Claims, 20 Drawing Sheets

METHOD AND APPARATUS FOR REDUCING DISTORTION IN IMAGES

CROSS-REFERENCE TO RELATED APPLICATION

This application claims priority to U.S. Provisional Patent Application entitled "Method to Minimize Perspective Distortions in Non-Single Viewpoint Imaging Systems," Ser. No. 60/220,024, filed on Jul. 21, 2000, which is incorporated herein by reference in its entirety.

STATEMENT REGARDING FEDERALLY SPONSORED RESEARCH OR DEVELOPMENT

This invention was partially made with U.S. Government support from the National Science Foundation, Information Technology Research Award No. IIS-00-85864; DARPA/ONR MURI Contract No. N00014-95-1-0601; and DARPA Human Identification Program Contract No. N00014-00-1-0929. Accordingly, the U.S. Government may have certain rights in this invention.

BACKGROUND OF THE INVENTION

1. Field of the Invention

The present invention relates generally to imaging methods and systems, and more particularly to methods and systems for reducing distortion of single-viewpoint projections derived from images captured by non-single viewpoint imaging systems.

2. Description of the Related Art

A typical imaging system receives one or more rays of light from each point in a scene being imaged. In a classic "pinhole" camera, a single ray of light is received from each scene point and is projected upon one point of a detector (e.g., a piece of film or CCD image detector array). In an imager which uses one or more lenses to collect more light than would otherwise be collected using a simple pinhole camera, a bundle of light rays is received from each scene point and is focused onto a single point of a focal plane within the imager. Each bundle of light emanating from a scene point is considered to have a chief ray which can be used to define the direction in which the scene point is located with respect to the field of view of the imager. Many conventional imaging systems are designed to have a single "viewpoint"—a point of intersection of all of the chief rays of the bundles of light received from the various scene points. The viewpoint can also be referred to as a "virtual pinhole".

FIG. 5A schematically illustrates an example of a single viewpoint imaging system. Incoming light rays 504 are effectively received by the system through a single viewpoint 502. The incoming light rays are projected—either directly or through internal optical components—onto an imaging plane 510 in the form of rays 508. A detector 506—which can include, for example, a piece of film or a CCD image detector array—is located at the imaging plane 510, and receives and detects the internal rays 508. The detector 506 generates, from the internal rays 508, an image which is a "perspective projection" of the scene as it would look if viewed directly from the virtual viewpoint 502.

The concept of a perspective projection can be further understood with reference to FIG. 5B. From a virtual viewpoint 502, geometric rays 514 and 524 can be considered to extend to various points (e.g., point 522) in the scene 512. If an arbitrarily-defined projection plane 510 is located between the virtual viewpoint 502 and the scene 512, a ray 514 extending from the viewpoint 502 to a scene point 522 intersects the plane 510 at a point 516. The set of points 516 in the projection plane 510 can be pixels representing, e.g., the brightness of each of the scene points 522. The set of such points 516 is considered to be a perspective projection (a/k/a/ a "perspective view"). It is desirable to obtain a perspective view (i.e., a perspective projection) of the scene 512, because within the field of view covered by the perspective projection, any other arbitrary perspective projection can be generated—i.e., a perspective projection can be generated using any other arbitrary plane. Furthermore, any arbitrary perspective projection of the scene 512—if viewed from the same distance and direction as those of the viewpoint 502 from which the perspective projection was generated—looks exactly as the scene 512 would look if viewed directly.

FIG. 5B also illustrates the projection of the scene 512 onto a cylinder 520. Such a projection can be referred to as a "panoramic projection." For example, a point 518 on the panoramic projection would be located at the intersection of ray 514 and the cylinder 520. Similarly, to a perspective projection, a panoramic projection can also be used to reconstruct how the scene would look if viewed directly from the viewpoint 502 used to generate the panoramic projection.

However, many imaging systems do not have a single viewpoint; in other words, not all of the chief rays of the bundles of light rays received by the imager intersect at a single point. Non-single viewpoint imagers can provide advantages such as wider field of view. However, unlike an image captured from a single viewpoint imager, an image captured by a non-single viewpoint imager typically cannot be used to generate an accurate, undistorted perspective view—or, in fact, any other single-viewpoint image—unless additional information regarding the scene geometry is available.

An example of a typical, non-single viewpoint imaging system is a fish-eye lens based system. Such a system is illustrated in FIG. 6. The illustrated system includes front objective lenses 606 which receive incoming rays 608. The incoming light is sent to a set of relay lenses 604 which focus the light unto an imaging plane 602. Such a system which includes lenses, but no reflective elements, can be referred to as a "dioptric" system.

Some imaging systems utilize reflective elements, rather than lenses, to capture images. Such systems can be referred to as "catoptric" systems. Examples of catoptric imaging systems are illustrated in FIGS. 7A, 7B, and 7C. Each of the systems 702 illustrated in FIGS. 7A, 7B, and 7C includes a pinhole camera 704 having a pinhole 708, and a reflector 706. In the system illustrated in FIG. 7A, the reflector 706 is spherical, and the camera 704 is positioned directly above the reflector 706. Such a system is an example of a catoptric system which does not have a single viewpoint. Accordingly, an image captured with such a system would not be a perspective view. The system can also be configured such that the camera 704 is not directly above the reflector 706, as illustrated in FIG. 7B. Furthermore, although the reflector 706 in the systems 702 illustrated in FIGS. 7A and 7B is spherical, non-spherical reflector surfaces have also been used, as illustrated in FIG. 7C.

In addition, although the above discussion refers to a camera 704 having an actual pinhole 708, most conventional cameras include lenses. Such a lens-based camera, if used as the camera 704 in one of the systems illustrated in FIGS. 7A, 7B, and 7C, would form a system including both mirrors and lenses. Such a system having both mirrors and lenses can be referred to as a "catadioptric" system.

Catadioptric systems such as those illustrated in FIGS. 7A, 7B, and 7C are capable of imaging extremely wide fields of view—significantly greater than 180° in certain configurations. However, such systems typically tend to be non-single viewpoint systems. Consequently, the wide field of view is obtained by sacrificing the ability to generate undistorted perspective views.

SUMMARY OF THE INVENTION

It is therefore an object of the present invention to provide an imaging system which reduces the distortion of images captured by non-single viewpoint imagers.

This and other objects are accomplished by the following-aspects of the present invention.

In accordance with one aspect of the present invention, the following method for imaging is provided. An image generated by an image-sensing system is received, the image-sensing system having a plurality of viewpoints. The image is generated based upon radiation rays received by the image-sensing system, the radiation rays coming from a scene. First information regarding a statistical distribution associated with at least one depth value of the scene is used for selecting a virtual viewpoint for a projection representing the scene. The virtual viewpoint is selected for reducing distortion of the projection. The image, the virtual viewpoint, and second information regarding at least one geometrical characteristic of the image-sensing system are used to generate the projection.

In accordance with an additional aspect of the present invention, another method for imaging is provided. In this method, an image generated by an image-sensing system having a plurality of viewpoints is received. The image is generated based upon radiation rays received by the image-sensing system, the radiation rays coming from a scene. First information regarding at least one geometrical characteristic of the image-sensing system is used to determine a portion of a caustic of the image-sensing system. An average location of the portion of the caustic is determined, and the average location is selected as a first virtual viewpoint for a projection representing the scene. The image, the first virtual viewpoint, and the first information are used for generating the projection.

BRIEF DESCRIPTION OF THE DRAWINGS

Further objects, features, and advantages of the present invention will become apparent from the following detailed description taken in conjunction with the accompanying figures showing illustrative embodiments of the invention, in which.

Figure 1:
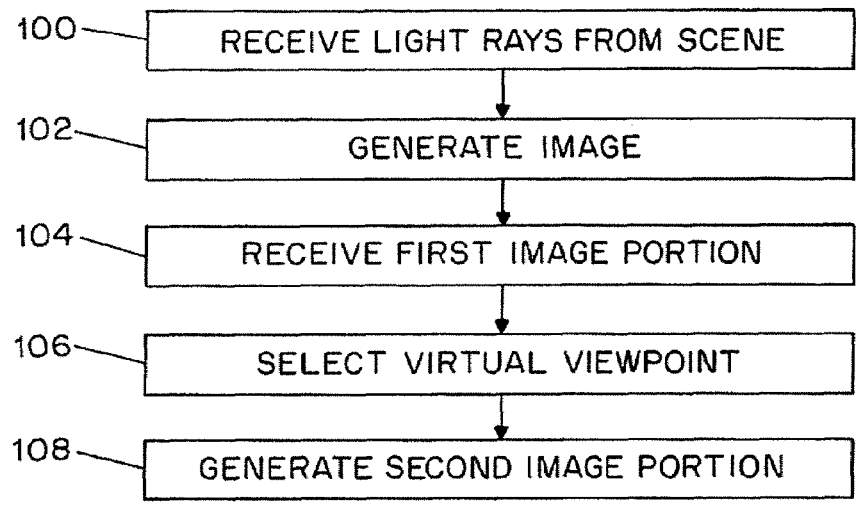
FIG. 1 is a flow diagram illustrating an exemplary procedure for reducing image distortion in non-single viewpoint imagers in accordance with the present invention.

Throughout the figures, unless otherwise stated, the same reference numerals and characters are used to denote like features, elements, components, or portions of the illustrated embodiments. Moreover, while the subject invention will now be described in detail with reference to the figures, and in connection with the illustrated embodiments, changes and modifications can be made to the described embodiments without departing from the true scope and spirit of the subject invention as defined by the appended claims.

DETAILED DESCRIPTION OF THE INVENTION

Figure 8:
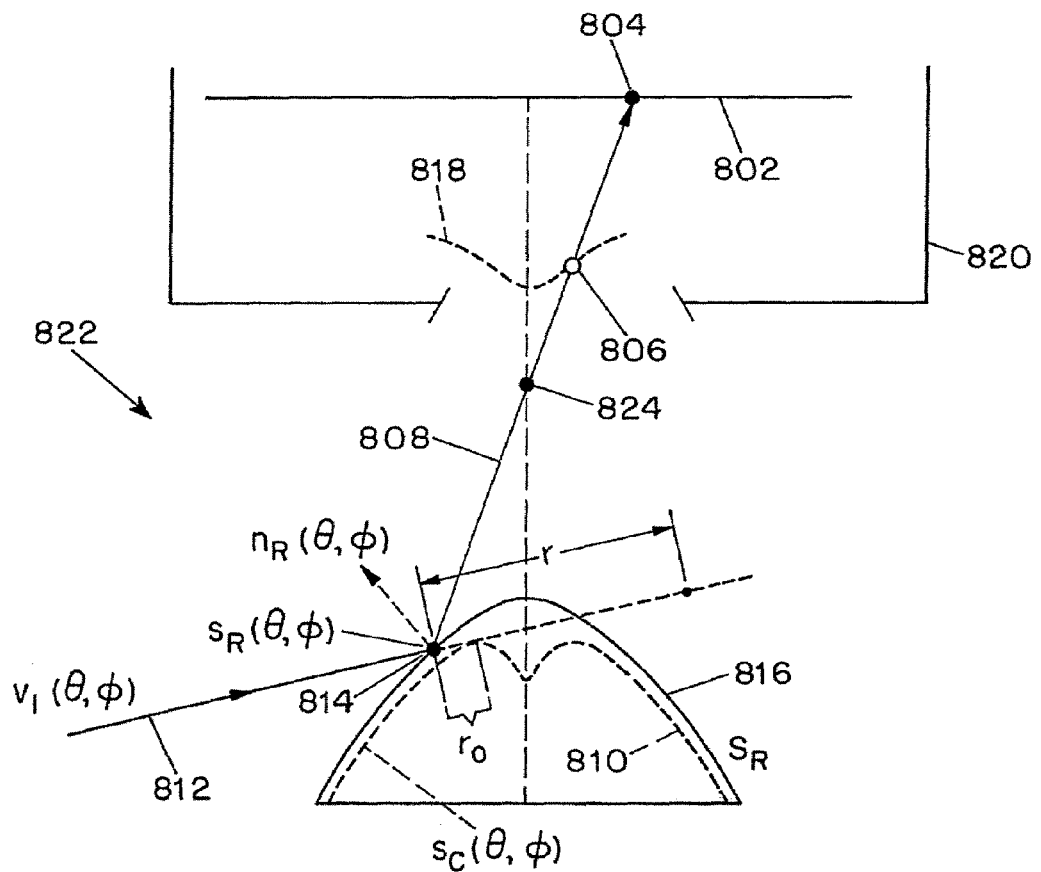
FIG. 8 is a diagram illustrating an exemplary non-single viewpoint imaging system in accordance with the present invention.

In a typical single viewpoint or non-single viewpoint imaging system, a light ray bundle having a particular chief ray is received from each point in the scene being imaged. The imager measures at least one property of the light coming from the scene point and generates a pixel value representing the value of the light property being measured. The imager generates an entire image by creating numerous pixels, each representing at least one property of the light emanating from a particular scene point. The position of each pixel within the image is determined by the chief ray of the bundle of light rays received from the scene point. An example of such an imaging system is illustrated in FIG. 8. The illustrated system 822 receives an incident ray 812 which strikes a reflecting surface 816 at a point of reflection 814. The incident ray 812 is the chief ray of a bundle of light rays emanating from a scene point. The reflected ray 808 enters a camera 820 and strikes a point 804 on the imaging plane (i.e., the focal plane) 802 of the camera 820.

Figure 21:
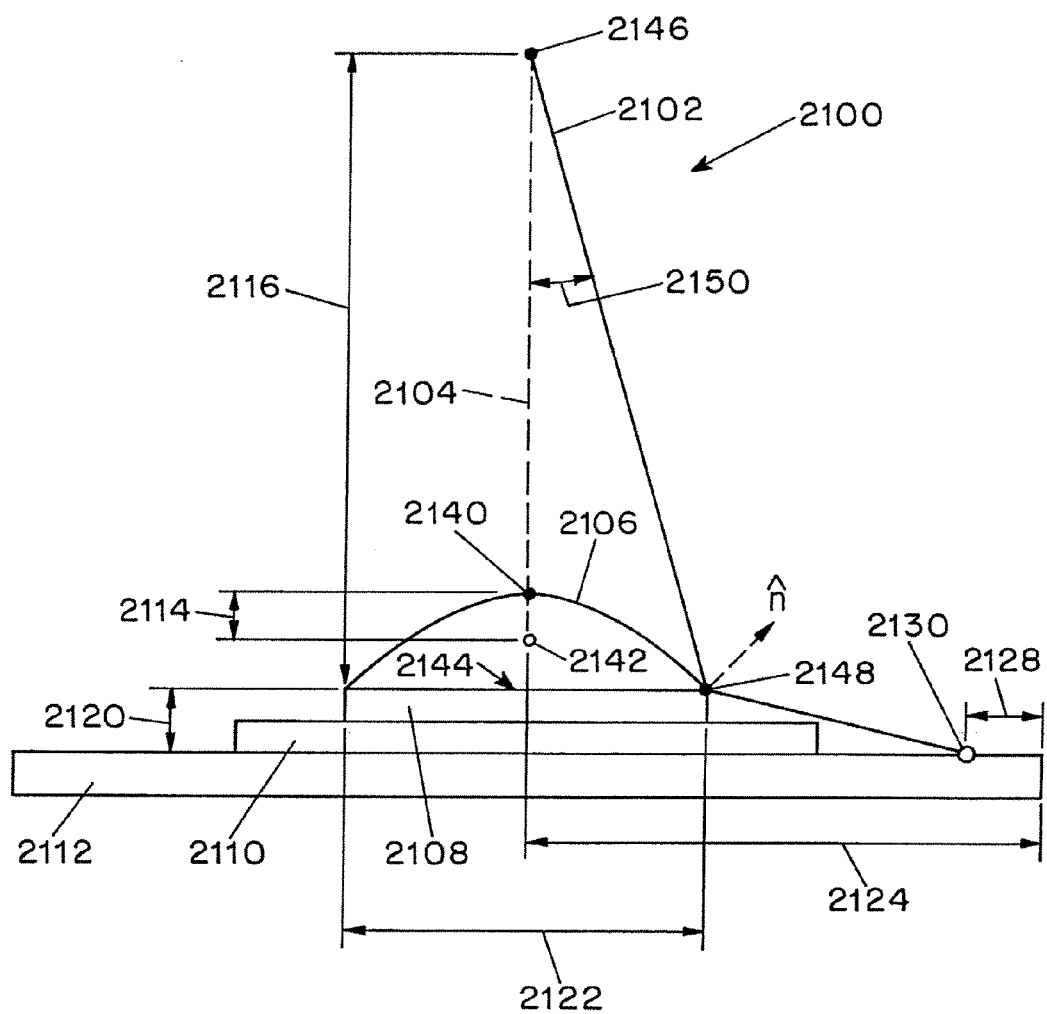
FIG. 21 is a diagram illustrating an exemplary non-single viewpoint imaging system m accordance with the present invention.

FIG. 21 illustrates an example of an image-sensing system 2100 in accordance with the present invention. The image-sensing system 2100 includes a parabolic reflector 2106 which sits upon one or more support platforms 2108 and 2110 which sit upon a base 2112. The distance 2114 between the focus 2142 and the vertex 2140 of the reflector 2106 is 16.7 mm. The total height 2120 between the base 2144 of the reflector 2106 and the base 2112 of the imager 2100 is 18 mm. The diameter 2122 of the reflector is 80 mm. The radius 2124 of the base 2112 of the system 2100 is 95.5 mm. A marker 2130 is placed a distance 2128 of 18 mm from the edge of the base 2112 of the system 2100. The system 2100 is designed for use with a camera having a pinhole 2146 having a height 2116 of 142.1 mm above the top support platform 2108. The angle 2150 between the optical axis 2104 of the system 2100 and the edge 2148 of the reflector 2106 is 15.72°.

In accordance with the present invention, the geometrical properties of an imaging system—such as, for example, the system 822 illustrated in FIG. 8 or the system 2100 illustrated in FIG. 21—can be modeled as a ray surface which includes a set of points and corresponding chief rays passing through the points. Each chief ray of the ray surface is a chief ray of a bundle of light rays received from a scene point. For example, as illustrated in FIG. 8, the camera 820 has a ray surface 818 which includes a point 806 and a corresponding ray 808 which passes through the point 806.

The ray surface 818 can be defined to have any arbitrary shape, provided that it includes points through which light rays pass as they enter the camera 820. The ray surface in effect represents a set of viewpoints from which the respective scene portions are viewed. If, for a particular imager, it is possible to calculate a ray surface which consists of a single point, yet receives all incoming rays from a scene portion comprising more than one point, then the imager is a single viewpoint imager with respect to that particular scene portion.

In addition, the reflecting surface 816 can have its own ray surface 810, and this ray surface 810 can also serve as a ray surface for the entire imaging system 822, including the camera 820 and the reflecting surface 816. As is discussed in further detail below, it is advantageous to select, as a ray surface, the surface to which every incident ray is tangent. Such a ray surface can be referred to as the "caustic" of the system. A caustic can usually be viewed as the most compact possible ray surface for a particular imager. Therefore, if the caustic consists of a single point (which can be considered a degenerate case), the imager is a single viewpoint system. Furthermore, even for a system having a caustic which includes more than one point, if the system has a relatively compact caustic, the system will generally produce images having less distortion than a system having a less compact caustic.

Figure 9:
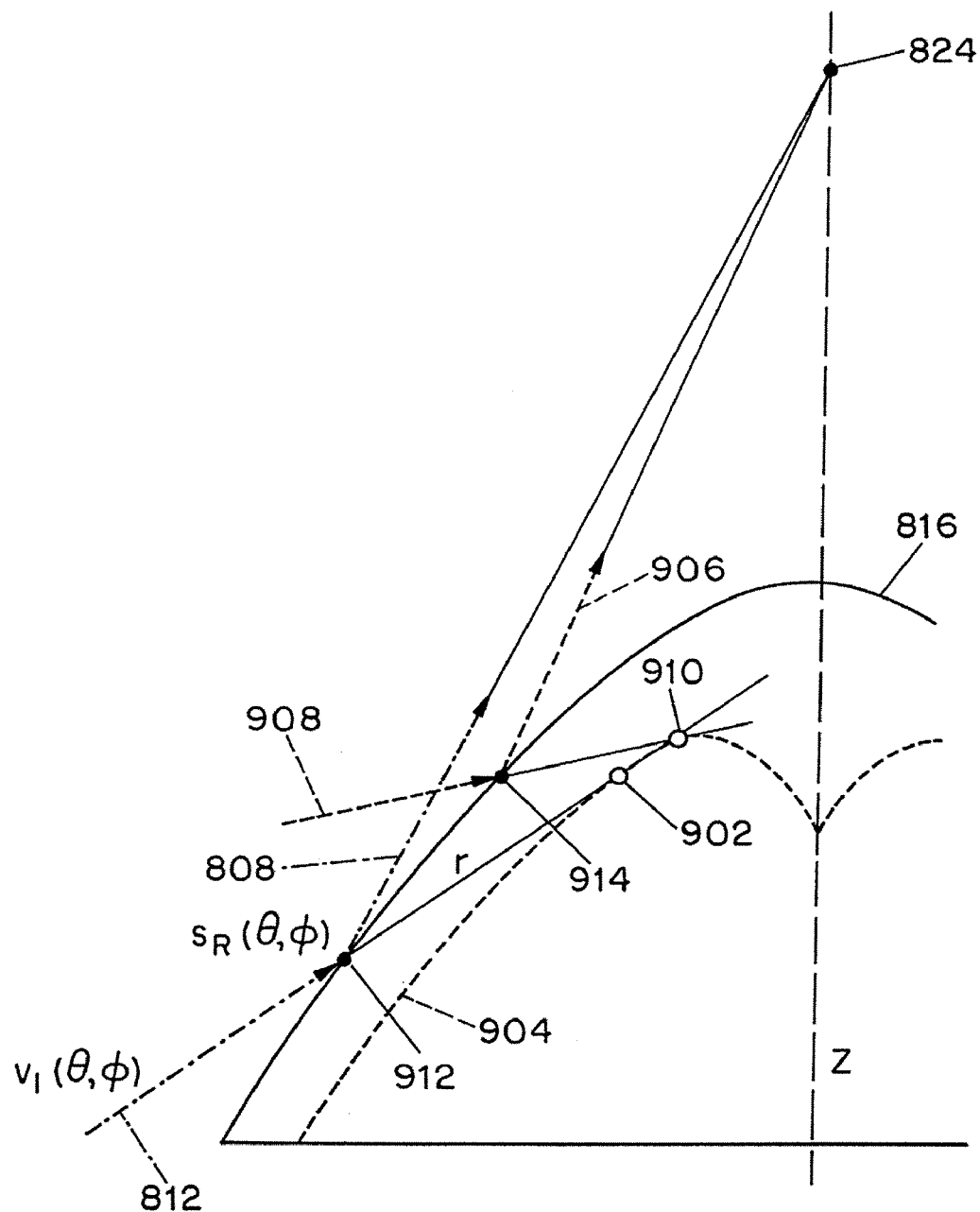
FIG. 9 is a diagram illustrating the operation of an exemplary reflector for use in a non-single viewpoint imaging system in accordance with the present invention.

FIG. 9 illustrates the determination of an exemplary caustic 904 of a reflector 816 in accordance with the present invention. The reflector 816 receives light rays 812 and 908 from points in the scene being imaged. Light rays 812 and 908 are the chief rays of light ray bundles coming from the respective scene points. The caustic 904 is determined by deriving a surface to which every incoming imaged ray is tangent. The caustic is not penetrated by any imaged ray coming from the scene. It is to be noted that although rays from a particular scene point likely strike the reflective surface 816 in many places, the rays being analyzed for the purpose of determining the caustic 904 are those which, when reflected, pass through the pinhole (or virtual pinhole) 824 of the camera 820, because such rays define the respective points on the imaging plane 802 which represent the various scene points. For example, incoming ray 812 is reflected from a point 912 on the reflective surface 816 to form a reflected ray 808 which passes through the pinhole 824 of the camera 820 capturing the image. Incoming ray 908 is reflected at a different point 914 on the reflective surface 816 to thereby form an additional reflected ray 906 which passes through the pinhole 824. Any ray not passing through the pinhole 824 is ignored for the purposes of this calculation. Incident ray 812 is tangent to the surface of the caustic 904 at a point 902, and incident ray 908 is tangent to the surface of the caustic 904 at a different point 910. In accordance with the invention, the caustic is defined as the set of all points (including points 902 and 910) and the corresponding incoming rays (including rays 812 and 908) which pass through each of the points on the surface of the caustic 904. It is to be noted that in a true single viewpoint system, all chief rays intersect at a single point. Such a system represents the above-described, degenerate case in which the caustic surface 904 is collapsed into a single point.

A technique for computing caustics in accordance with the invention is described as follows. Consider the exemplary system 822 illustrated in FIG. 8, which is radially symmetrical about an axis 826. As discussed above, a ray surface has two parts, a parameterized surface of points $S_{surface}$ in three dimensions, and a three-dimensional vector $V_{surface}$ for each point on the surface $S_{surface}$. In the illustrated example, the direction of each ray can be defined in spherical coordinates, according to the azimuthal angle $\theta$ and pitch angle $\phi$ of the ray. A reflected ray 808 has a direction $v_R(\theta, \phi)$. From the geometry of the optical system, the point of reflection $s_R(\theta, \phi)$ can be computed as follows. For each reflected ray $V_R(\theta, \phi)$, the incident ray direction $V_I(\theta, \phi)$ is computed from the well-known reflection equation:

$$V_R(\theta, \phi) = V_I(\theta, \phi) - 2(n_R(\theta, \phi) V_I(\theta, \phi)) n_R(\theta, \phi) \quad (1)$$

where $n_R(\theta, \phi)$ denotes the normal vector at the point of reflection $s_R(\theta, \phi)$. The ray surface of incoming rays of light is then given by $l_I(\theta, \phi) = (s_R(\theta, \phi), v_I(\theta, \phi))$.

A discussed above, the caustic is the surface which is tangential to all the incoming chief rays. In other words, the caustic can be considered the "envelope" of all of the incident chief rays. Points along an incident ray can be parameterized as a function of the distance r from the point of reflection $s_R(\theta, \phi)$, as illustrated in FIG. 9. Let $r_0$ be the value of r along some ray which is parameterized as a function $U_{ray} = s_I(\theta, \phi) + r v_I(\theta, \phi)$—where $r_0$ represents the point at which the ray is tangential to the caustic. At this point $U_{ray}(r_o) = s_I(\theta_0, \phi_0) + r_0 v_I(\theta_0, \phi_0)$, taking an infinitesimal step in the direction of $v_I(\theta, \phi)$ is equivalent to changing ray directions and switching to a different ray. In other words, $r_0$ is a singularity of the function $U_{ray}$ which describes points along incident rays. This property can be used in computing the caustic. Let vector valued function L be defined such that $L(\theta, \phi, r) = (s_R(\theta, \phi) + r v_I(\theta, \phi), v_I(\theta, \phi))$. Each value of this function has six dimensions—i.e., three position dimensions and three orientation dimensions—and represent points along a particular incident ray 812. However, to extract only position information, only the position function $L' = s_R(\theta, \phi) + r v_I(\theta, \phi)$ is needed. The caustic is then defined as the locus of the singularities of L'. In order for L' to be singular, the determinant of its Jacobian J (L') must vanish. I.e., the caustic is the set of points at which:

$$det(J(L'))(\theta, \phi, r)) = 0 \quad (2)$$

Although Eq. (2) applies to the above-described, general, three-dimensional case, computing the caustic in two dimensions is sufficient for a radially symmetric optical system. For the two-dimensional calculation, let the reflecting surface be $S_R$, the reflecting ray be $v_R(\phi)$, and the point of reflection be $s_R(\phi)$. The incident ray of light is then described by the reflection equation (Eq. (1)).

Points along the incident ray are, as above, parameterized as a function of the distance r from the point of reflection. The vector valued function L is now defined as:

$$L(\phi, r) = (s_R(\phi) + r v_I(\phi), v_I(\phi)) \quad (3)$$

As before, only the position information is required:

$$L'(\phi, r) = ((s_I)_x + r(v_I)_x, (s_I)_y + r(v_I)_y) \text{ where } s_I = s_R \quad (4)$$

The x and y components of $s_I$ are denoted as $(s_I)_x$ and $(s_I)_y$, respectively. The same convention is also used for $v_I$. To compute the caustic curve, the determinant of the Jacobian det $(J(L')(\phi, r))$ must vanish. The determinant is given by:

$$det(J(L')(\phi, r)) = det\left(\begin{bmatrix} (\dot{s}_I)_x + r \cdot (\dot{v}_I)_x (v_I)_x \\ (\dot{s}_I)_x + r \cdot (\dot{v}_I)_y (v_I)_y \end{bmatrix}\right) =$$

$$((\dot{s}_I)_x + r \cdot (\dot{v}_I)_x)(v_I)_y) - ((\dot{s}_I)_y + r \cdot (\dot{v}_I)_y)(v_I)_x,$$

Where $$\dot{s}_I = \frac{ds_I}{d\phi} \text{ and } \dot{v}_I = \frac{dv_I}{d\phi} \cdot r(\phi)$$

can be solved for explicitly by enforcing the singularity constraint:

$$r(\phi) = \frac{(\dot{s}_I)_y (v_I)_x - (\dot{s}_I)_x (v_I)_y}{(\dot{v}_I)_x (v_I)_y - (\dot{v}_I)_y (v_I)_x} \quad (5)$$

Finally, substituting $r(\phi)$ back into Eq. (3) gives the parameterization of the bundle of rays on the caustic.

$$S_c(\phi) = (L')(\phi, r(\phi)) = \left( S_R(\phi) + \frac{(\dot{s}_I)_y (v_I)_x - (\dot{s}_I)_x (v_I)_y}{(\dot{v}_I)_x (v_I)_y - (\dot{v}_I)_y (v_I)_x} \cdot v_i(\phi) \right) \quad (6)$$

Figure 10A:
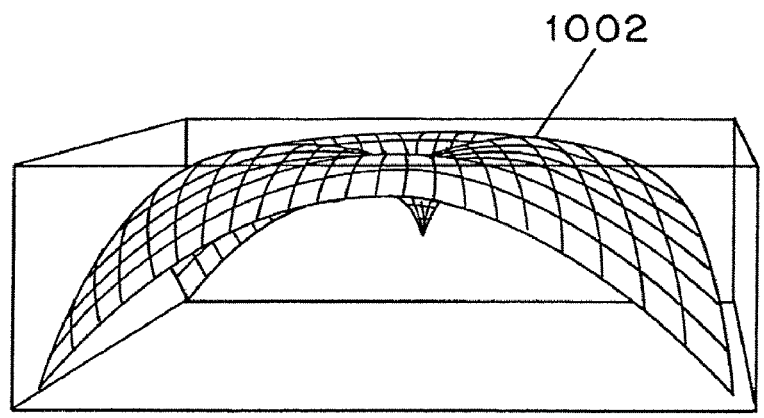
FIG. 10A is a three-dimensional graph illustrating a caustic of an exemplary parabolic reflector.
Figure 10B:
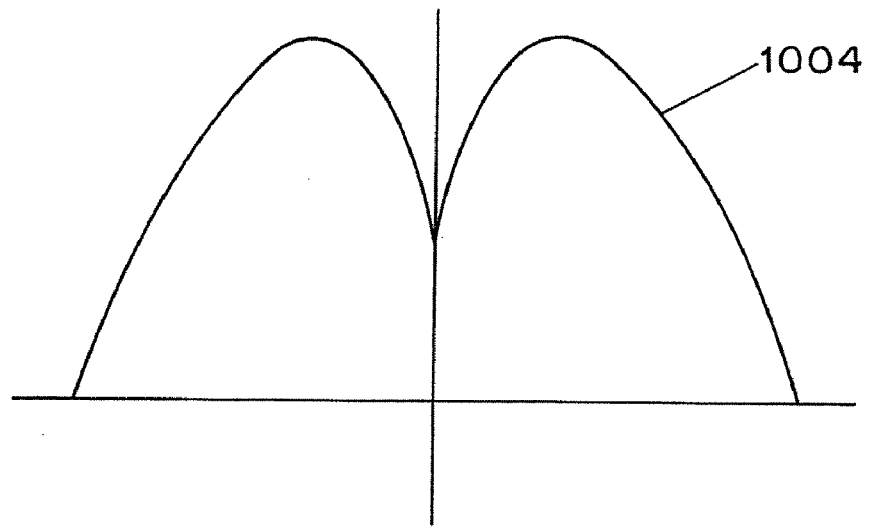
FIG. 10B is a two-dimensional graph illustrating a caustic of an exemplary parabolic reflector.
Figure 10C:
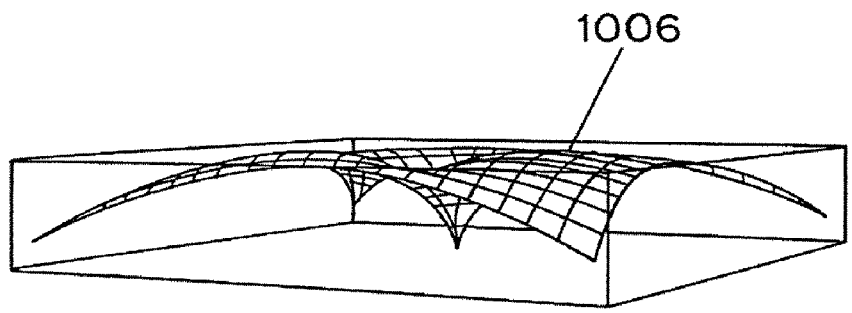
FIG. 10C is a three-dimensional graph illustrating a caustic of an exemplary hyperbolic reflector.
Figure 10D:
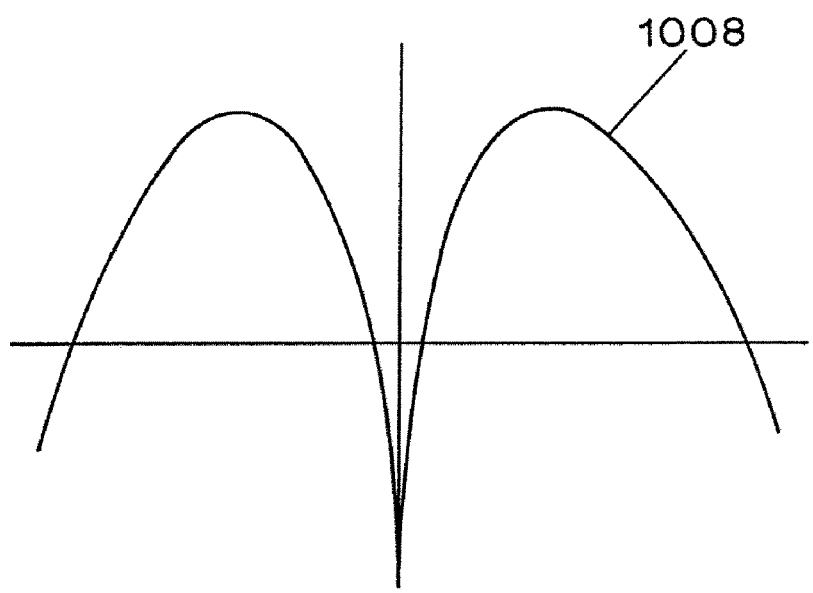
FIG. 10D is a two-dimensional graph illustrating a caustic of an exemplary hyperbolic reflector.

FIGS. 10A, 10B, 10C, and 10D illustrate caustics of exemplary non-single viewpoint systems. FIG. 10A is a three-dimensional plot of a caustic 1002 of a reflector having a paraboloid shape. FIG. 10B is a two-dimensional plot 1004 of the caustic 1002 illustrated in 10A, or alternatively, can be viewed as the plot of a caustic 1004 of a two-dimensional parabolic reflector (e.g., a parabolic trough). FIG. 10C is a three-dimensional plot of a caustic 1006 of a reflector having a hyperboloid shape. FIG. 10D is a two-dimensional plot of a caustic 1008 which can be either: (1) a two-dimensional cross-section of the caustic 1006 illustrated in FIG. 10C, or (2) a plot of the caustic of a two-dimensional, hyperbolic reflector (e.g., a hyperbolic trough).

Figure 11:
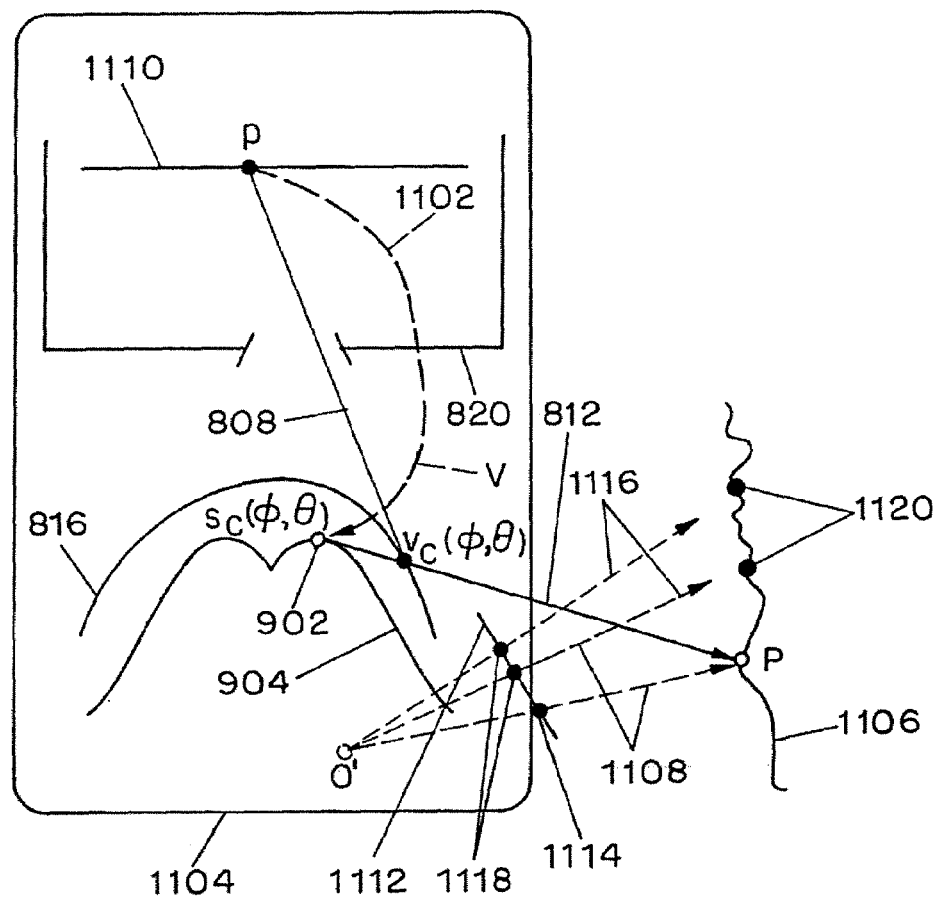
FIG. 11 is a diagram illustrating the operation of an exemplary image processing system in accordance with the present invention.

As discussed above, it is beneficial to generate a perspective projection based upon an image captured by an imaging system, because when viewed by the human eye, a perspective projection of a scene accurately represents what the eye would see if looking at the scene from the virtual viewpoint of the perspective projection. FIG. 11 illustrates a method for generating such a perspective projection in accordance with the present invention. A bundle of light rays having a chief ray 812 emanates from a scene point P within the scene 1106 and is received into an imaging system 1104 having a reflective surface 816. The incoming ray 812 is reflected from the reflective surface 816 to generate a reflected ray 808 which is received into a camera 820 and strikes the detector 1110 of the camera 820 at a point p. The detector 1110 generates a pixel based upon at least one characteristic (e.g., brightness) of a light ray 808 striking the detector at point p. The incident ray 812 can be mathematically extended to intersect a point 902 on a ray surface 904. In the illustrated example, the ray surface 904 is the caustic of the reflector 816. Based upon the geometry of the system, a one-to-one correspondence exists between each point P in the image captured by the detector 1110 and each point 902 on the ray surface 904. Furthermore, each point (e.g., 904) on the ray surface 904 has associated therewith a particular incident ray (e.g., incident ray 812). Accordingly, if the geometry of the system 1104 is known, and the location of a pixel p within an image captured by a detector 1110 is known, a map 1102 is used to determine the ray 812 along which the system 1104 received the light which generated the pixel p. An algorithm in accordance with the present invention creates and utilizes one or more look-up tables (LUTs) which match each pixel of an image to the incoming chief ray whose reflected ray generated the pixel. The mapping V from a pixel location to a corresponding incoming ray can be referred to as the "forward map," and the mapping I from an incoming ray to the location, within the captured image, of the pixel generated by light received along the incoming ray can be referred to as the "inverse map," because it is the inverse of the forward map V.

If the distance between the scene point P and the reflector 816 or ray surface 904 is known exactly, the exact location of the scene point P can be determined simply by back-tracing the incoming ray 812 for the required distance. An image point 1114 within a perspective view 1112 having any virtual viewpoint O' can be generated in its proper location by determining where a ray 1108—which extends between the virtual viewpoint O' and the scene point P—intersects the perspective view 1112. The entire perspective view 1112 can be generated by: (1) tracing the rays 1116 between various scene points 1120 and the virtual viewpoint O', and (2) determining the locations of the points 1118 at which the respective rays 1116 intersect the plane of the perspective view 1112.

Figure 12:
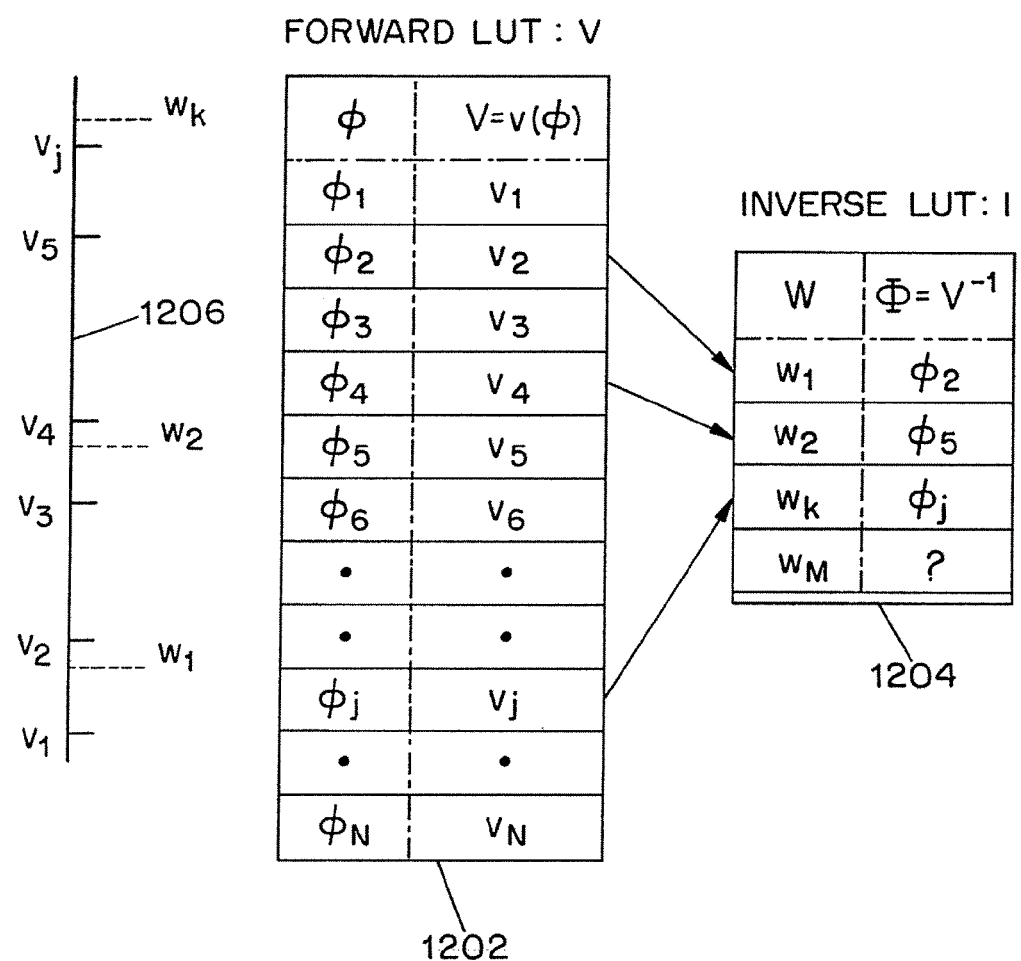
FIG. 12 is a diagram illustrating exemplary mapping tables in accordance with the present invention.

An algorithm in accordance with the present invention can be used to estimate a ray-image map for an imager. For rotationally symmetric optical systems, the procedure can be treated as a problem in one dimension—i.e., the displacement from the center of the field of view. Let the image points be parameterized as functions of an angle $\phi$ representing the viewing direction relative to the center of the field of view. The vector along the corresponding viewing direction is then given by $v_j(\phi)$. The forward map V is computed for a densely sampled set of image points $\Phi=\{\phi_1, \phi_2, \ldots, \phi_j, \ldots, \phi_N\}$. The computed viewing directions are given by $V=\{v_1, v_2, \ldots, v_j, \ldots, v_N\}$. As illustrated in FIG. 12, each calculated viewing direction $v_j$ is listed, with its corresponding image point $\phi_j$, in a Forward Look Up Table (Forward LUT) 1202. Once the Forward LUT 1202 is generated, the algorithm uses the Forward LUT 1202 to generate an inverse map I for the set of viewing directions $W=\{w_1, w_2, \ldots, w_k, \ldots, w_M\}$. For each $w_k$, in W, the algorithm searches for the nearest direction $v_j$ in V. The corresponding $\phi_j$ is the image point which is closest to the true inverse of $w_k$. As illustrated in FIG. 12, the algorithm generates an Inverse Look Up Table (Inverse LUT) 1204 which relates each value of $w_k$ with a corresponding value of $\phi_j$. As illustrated in the graph 1206 of viewing directions, the viewing direction $w_1$ is closer to $v_2$ than to $v_1$. Therefore, the closest inverse map value corresponding to $w_1$ is $\phi_2$. The same procedure is applied to points $w_2$ through $w_k$.

In the above example, the value of $\phi_j$ obtained by the above process is the closest neighbor to the true inverse of $w_k$. However, $\phi_j$ can also be calculated by interpolating its closest neighbors. In addition, the closest neighbors can be used as bounds for a localized search of the true inverse of $w_k$. Such a localized search is more efficient than a "brute force" search over the entire space of possible solutions.

In order to compute the inverse map I, it is preferable to create a densely sampled forward map $V=v_j(\theta, \phi)$. Furthermore, for any desired viewing direction $w_k$, there can exist a computed forward map $v_j$ such that $|w_k - v_j| \epsilon$, where $\epsilon$ is a maximum amount of error, and the forward function should be sampled densely enough to meet this criterion. Undersampling is likely to result in errors, while over-sampling is likely to result in redundant data. An algorithm in accordance with the present invention can estimate the preferred resolution at which to sample the forward map, assuming that the forward map is to be uniformly sampled.

The following analysis applies to the sampling rate for a one dimensional forward map. Let $y=f(x)$ be a forward map in one dimension, and assume that $f(x)$ is known and is twice differentiable. The maximum permissible error in the inverse map is $\epsilon$. If $\Delta y$ denotes the difference between any two successive y values, then $\Delta y$ $\epsilon$. The problem then is to estimate the appropriate resolution $\Delta x$ at which to sample the forward map. In the limiting case as $$\Delta x \to 0, \frac{\Delta y}{\Delta x} = f' = \frac{dy}{dx}.$$

Therefore:

$$\Delta x = \frac{\varepsilon}{f'}$$

Determining the smallest $\Delta x$ for which the sampling rate is adequate implies that $f'$ should be maximized. The maximum value $f'(x)$ can have in the interval $x_L$ x $x_U$ is either a maximum of the function $f'(x)$ within the bounds $x_L$ and $x_U$, or the higher of the two function values at the aforementioned bounds. This technique can easily be extended to multiple dimensions, by simply assigning to each dimension its own critical sampling rate. This critical sampling rate can also be considered as the Nyquist rate—a type of minimum sampling rate which is well-known in the art.

It is thus demonstrated that if the depths of the various points P and 1120 in a scene 1106 are known, an exact perspective view can be calculated. However, in practice, the exact depth of the respective scene points is rarely known. Rather, in many cases, only a statistical distribution of the various depths is available.

Figure 13:
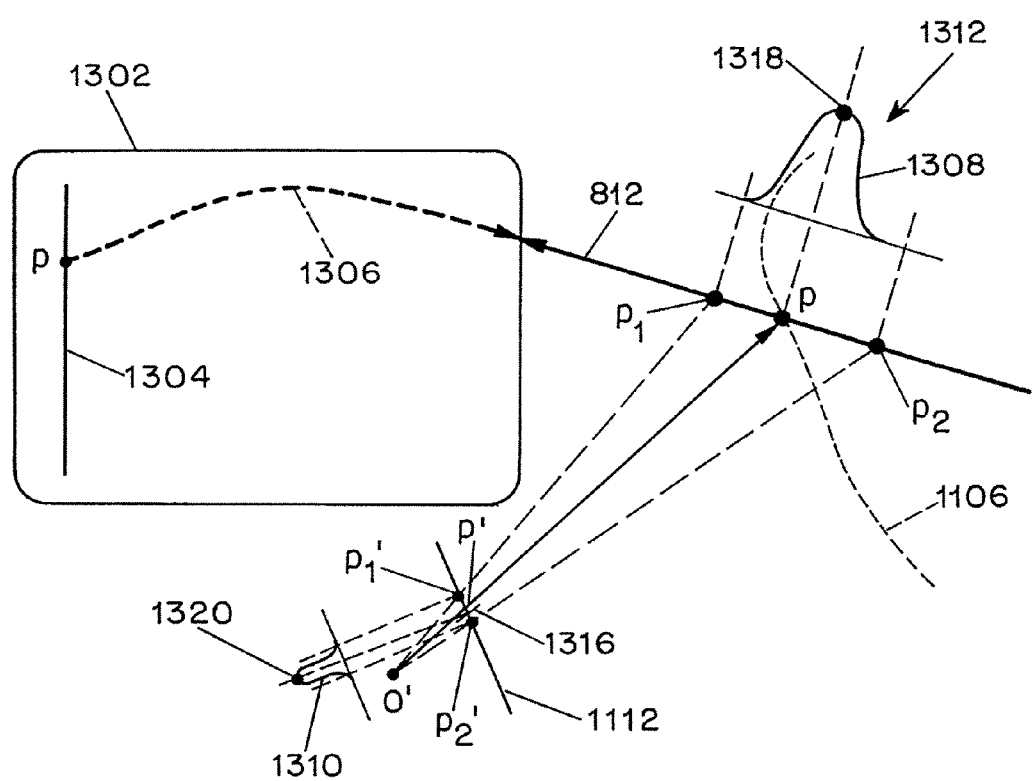
FIG. 13 is a graph illustrating the operation of an exemplary non-single viewpoint image processing system in accordance with the present invention.

FIG. 13 illustrates an exemplary procedure for generating an approximate perspective projection for circumstances under which the exact depths of the scene points are not known. From each scene point P, an incident ray 812 is received by an imaging system 1302 which measures the characteristics (e.g., intensity) of the incident ray 812 and uses the measured characteristics to generate a pixel at a point p on an image plane 1304. The characteristics of the imager 1302 are known, and can be used to generate a mathematical or tabular mapping 1306 from the location p of the pixel to the incident ray 812. In other words, the location of each pixel is known, and the mapping 1306 can therefore be used to determine which incident ray caused the generation of each pixel by an image detector at the image plane 1304. If the distance between the scene point P and the imager 1302 were known, then the viewing direction of the scene point P from the virtual view point O' would be known, and could therefore be used to determine the "true" (i.e., correct and exact) location p' of the pixel in a perspective projection 1112 representing the scene points P. However, because the distance between the scene point P and the imager 1302 is not known exactly, the true location p' of the pixel in the perspective projection 1106, which would represent the scene point P, cannot be determined exactly.

However, often information is available regarding a range of possible depths of a scene point P. For example, it may be known that the scene point P is no closer than a minimum distance $P_1$, and no farther away than a maximum distance $P_2$. The geometry of the system and scene can be used to determine the point $p_1'$ oil the perspective projection 1112 which would represent the scene point P if the scene point P were located at the minimum depth $P_1$. In addition, the location $p_2'$ which would represent the scene point P if it were located at the maximum depth $P_2$ can also be determined. It is therefore known that the true pixel location p' lies within a region defined by the outer limits $p_1'$ and $p_2'$. In particular, the true location p' typically lies on a line segment defined by the outer limits $p_1'$ and $p_2'$.

If no information is available regarding the statistics of the depth of the scene point P, other than that the scene point P lies somewhere between $P_1$ and $P_2$, then the midpoint of the line segment between $p_1'$ and $p_2'$ can be used as a rough approximation of the true location p' of the pixel representing the scene point P.

However, in many cases, further statistical information is available regarding the depth distribution of points in the scene 1106. For example, the distribution of the depths of scene points may be in the form of a Gaussian distribution 1308 having a central value 1312. Each depth value of the Gaussian distribution 1308 corresponds to a location on the perspective projection 1112, and accordingly, the probability associated with each depth value in the statistical distribution 1308 equals the probability associated with the corresponding point on the perspective plane. For example, the probability 1318 associated with the peak value 1312 of the Gaussian distribution 1308 illustrated in FIG. 13 is the same as the probability 1320 associated with the corresponding point 1316 on the perspective projection. In fact, by using each depth value associated with a depth distribution 1308 to calculate the location of a corresponding point on the perspective projection 1112, and by setting the probability associated with the point on the perspective projection equal to that associated with the depth value, a statistical distribution 1310 associated with locations on the perspective projection 1112 can be generated. The distribution 1310 of locations within the perspective projection 1112 can be used to estimate the true location p' of the pixel, in the perspective projection, which represents the scene point P. For example, the peak of the statistical distribution 1310 of perspective projection locations can be used as the estimate of the true location p' of the pixel, in the perspective projection, which represents the scene point P. Furthermore, it is to be noted that although the depth distribution 1308 illustrated in FIG. 13 has a Gaussian shape, an algorithm in accordance with the present invention is not limited to the use of Gaussian distributions, and can, in fact, use any other probability distribution of depth.

A general example of a distortion reducing algorithm as discussed above is illustrated in FIG. 1. An image-sensing system having a plurality of viewpoints is used to receive light rays or other radiation rays from a scene (step 100). The image-sensing system generates an image based on the received radiation rays (step 102). The image, which can be, for example, an image generated by a CCD detector, is received into the distortion reducing algorithm (step 104). A virtual viewpoint is selected, preferably based upon the geometry of the image-sensing system (step 106). The image, the virtual viewpoint, and information regarding one or more geometrical characteristics of the image-sensing system are used—preferably in conjunction with statistical information regarding scene depths—to generate a projection representing the scene as viewed from the selected viewpoint (step 108). In step 106, the virtual viewpoint is preferably selected to be in a location which will reduce and/or minimize the distortion in the projection generated in step 108. For example, as discussed below, it may be preferable to select the average of a caustic as the location of the virtual viewpoint. Additional methods for selecting a virtual viewpoint include selecting the viewpoint which minimizes some quantitative indicator of distortion. Because the amount of distortion typically depends upon the scene depth statistics, the selection of the virtual viewpoint also typically depends on scene depth statistics. Several distortion minimization methods are discussed in further detail below.

Figure 2:
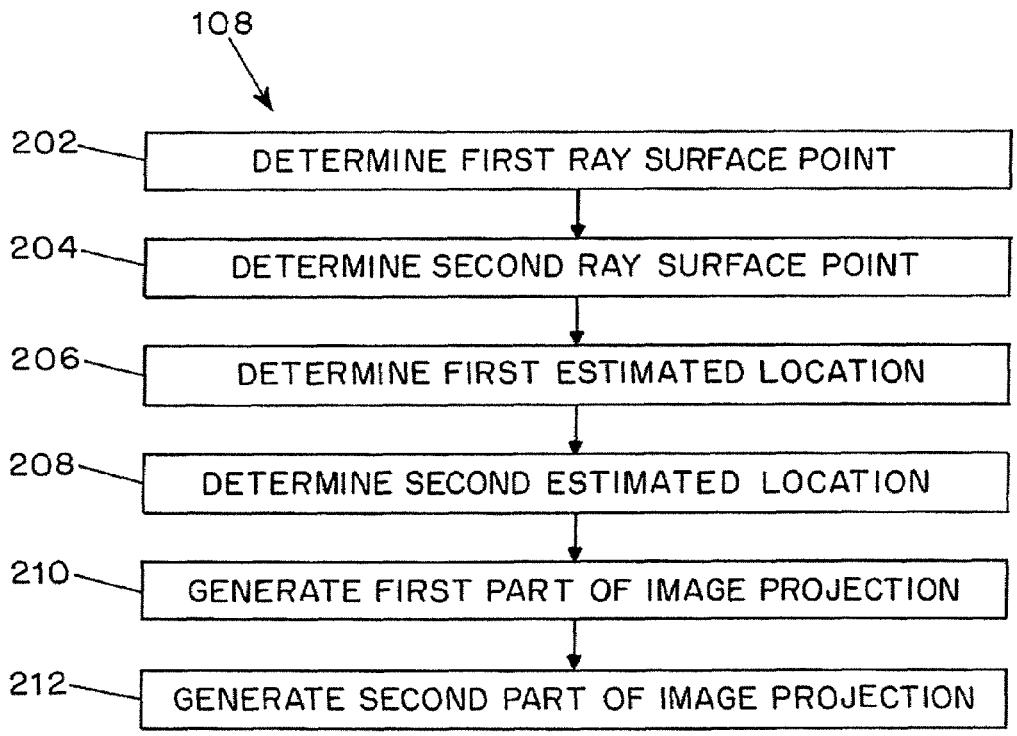
FIG. 2 is a flow diagram illustrating an additional exemplary procedure for reducing image distortion in non-single viewpoint imagers in accordance with the present invention.

FIG. 2 illustrates an example of the step 108, in the procedure of FIG. 1, which is used to generate the projection. In order to generate the projection, a first ray surface point of a ray surface is determined based on the geometry of the image-sensing system (step 202). A second ray surface point on the ray surface is similarly determined (step 204). A first estimated location of a point within the projection, which will represent a first scene point, is determined (step 206). In addition, a second estimated location, within the projection, which will represent a second scene point is also determined (step 208). As discussed above with respect to FIG. 13, the first and second estimated locations are preferably generated using an approximate triangulation procedure which considers the geometry of the image-sensing system used to capture the initial image. A first part of the projection is generated (step 210) by, for example, setting the brightness value associated with the first part of the projection equal to the brightness value of the portion of the initial image which represents the first scene region. Similarly, a second part of the projection is generated in the second estimated location (step 212), using the brightness value of the pixel in the initial image which represents the second scene region.

Figure 3:
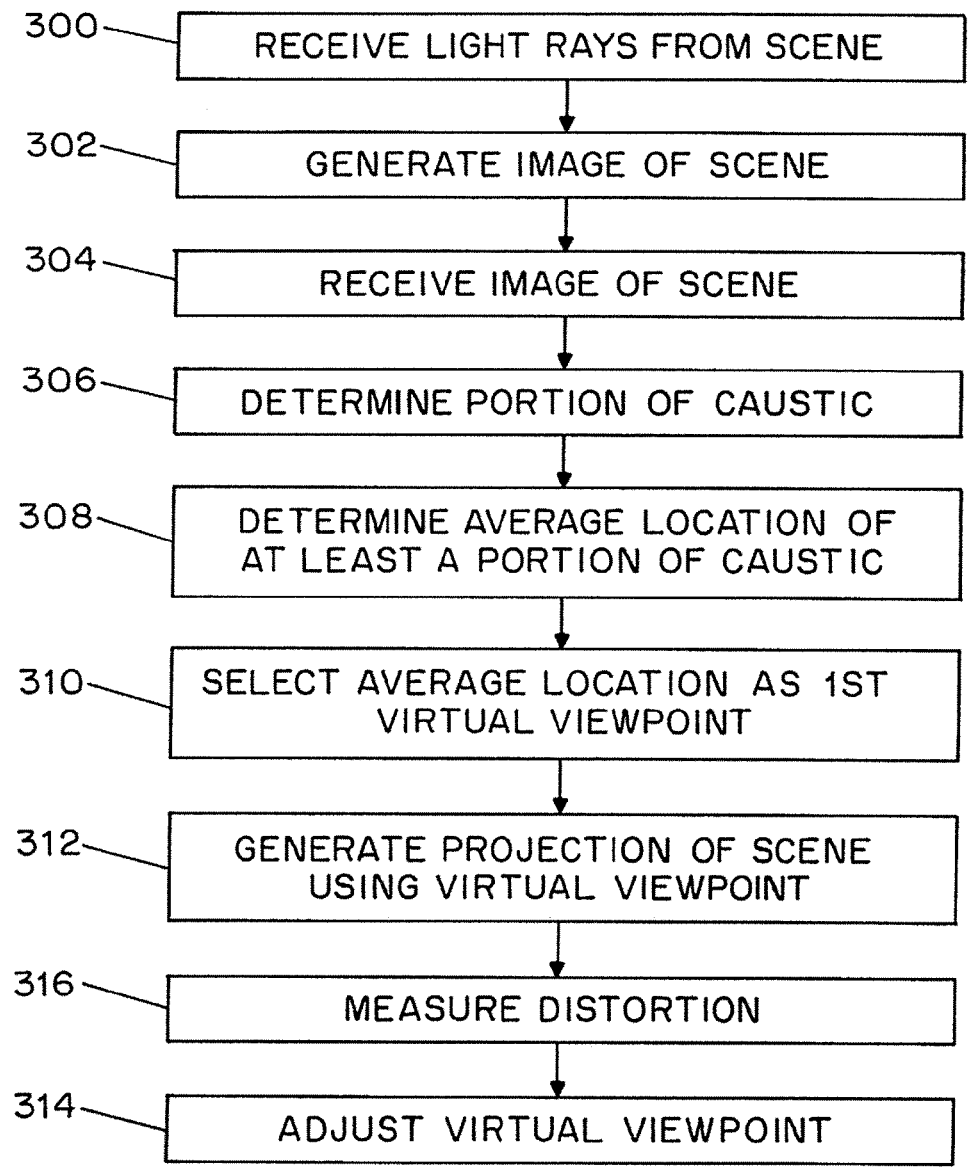
FIG. 3 is a flow diagram illustrating another exemplary procedure for reducing image distortion in non-single viewpoint imagers in accordance with the present invention.

FIG. 3 illustrates an exemplary procedure for determining the location of a virtual viewpoint so as to minimize the distortion in an image being processed. An image-sensing system receives light rays or other radiation rays from a scene (step 300), and uses the light rays to generate an image of the scene (step 302). A virtual viewpoint selection algorithm receives the image of the scene (step 304). A portion of a caustic is calculated based upon the geometry of the image-sensing (step 306). The algorithm calculates the average location of at least one portion of the caustic (step 308). This average location is selected as a first virtual viewpoint (step 310). Using the virtual viewpoint selected in step 310, the algorithm generates a projection representing the scene (step 312). The distortion of the projection is measured (step 316), preferably using one of the objective functions discussed in further detail below. Based upon the results of the distortion measurement, the virtual viewpoint is adjusted (step 314).

Figure 4:
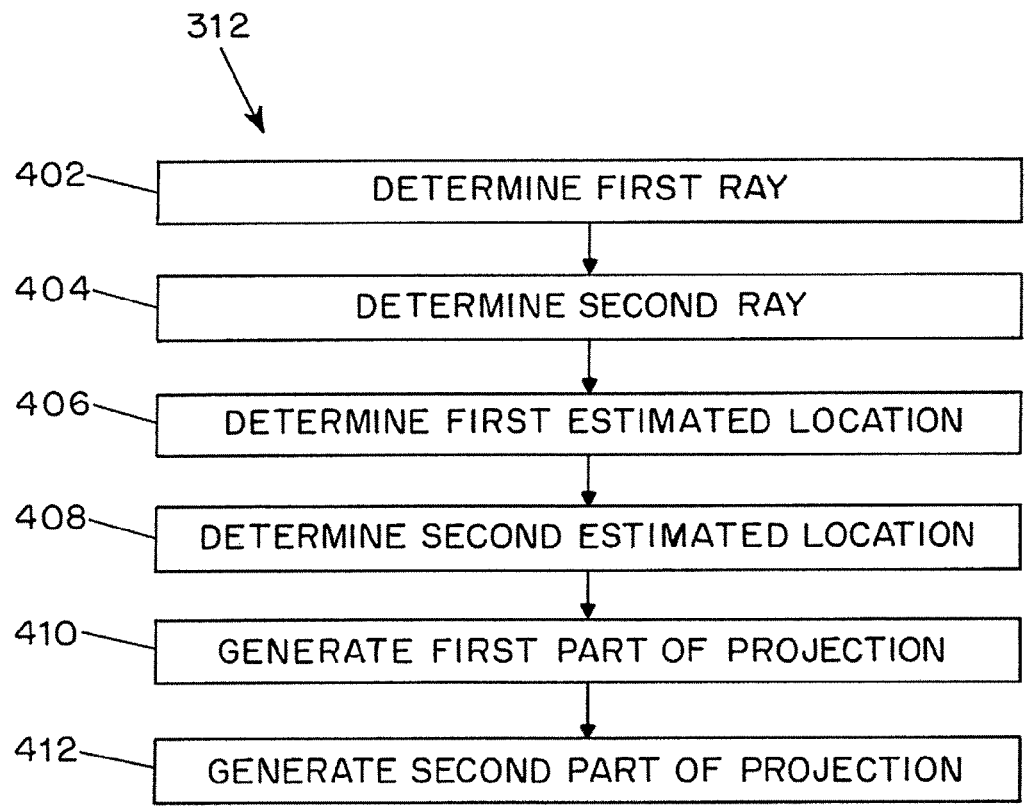
FIG. 4 is a flow diagram illustrating a further exemplary procedure for reducing image distortion in non-single viewpoint imagers in accordance with the present invention.
Figure 5A:
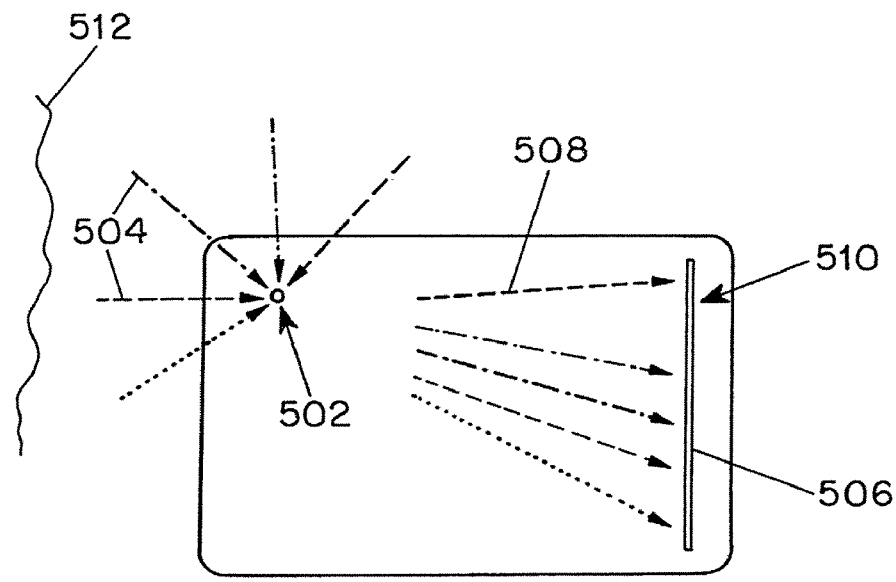
FIG. 5A is a diagram illustrating an exemplary single viewpoint imager.
Figure 5B:
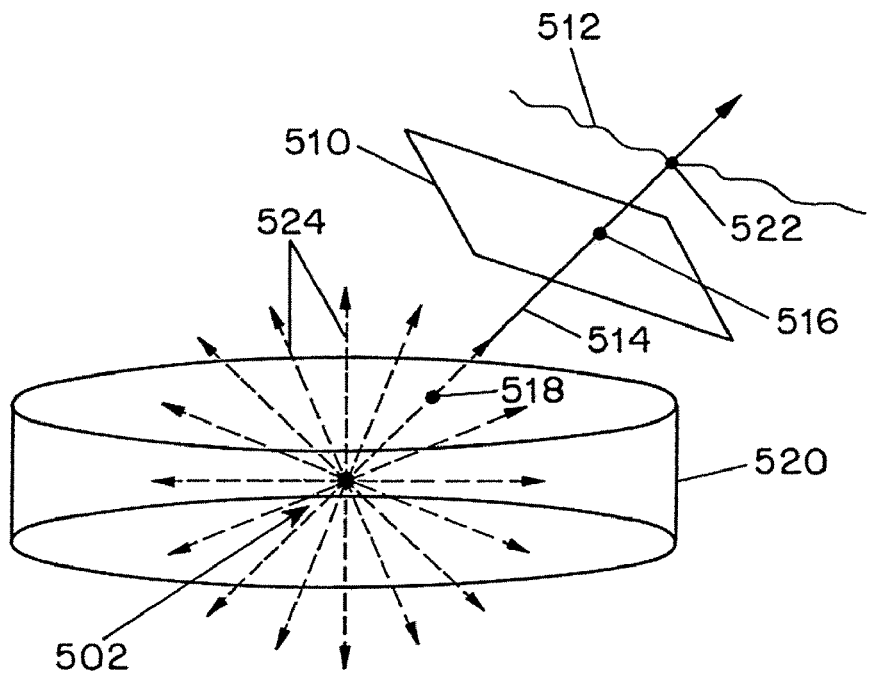
FIG. 5B is a diagram illustrating exemplary techniques for creating panoramic image projections in a single viewpoint imaging system.
Figure 6:
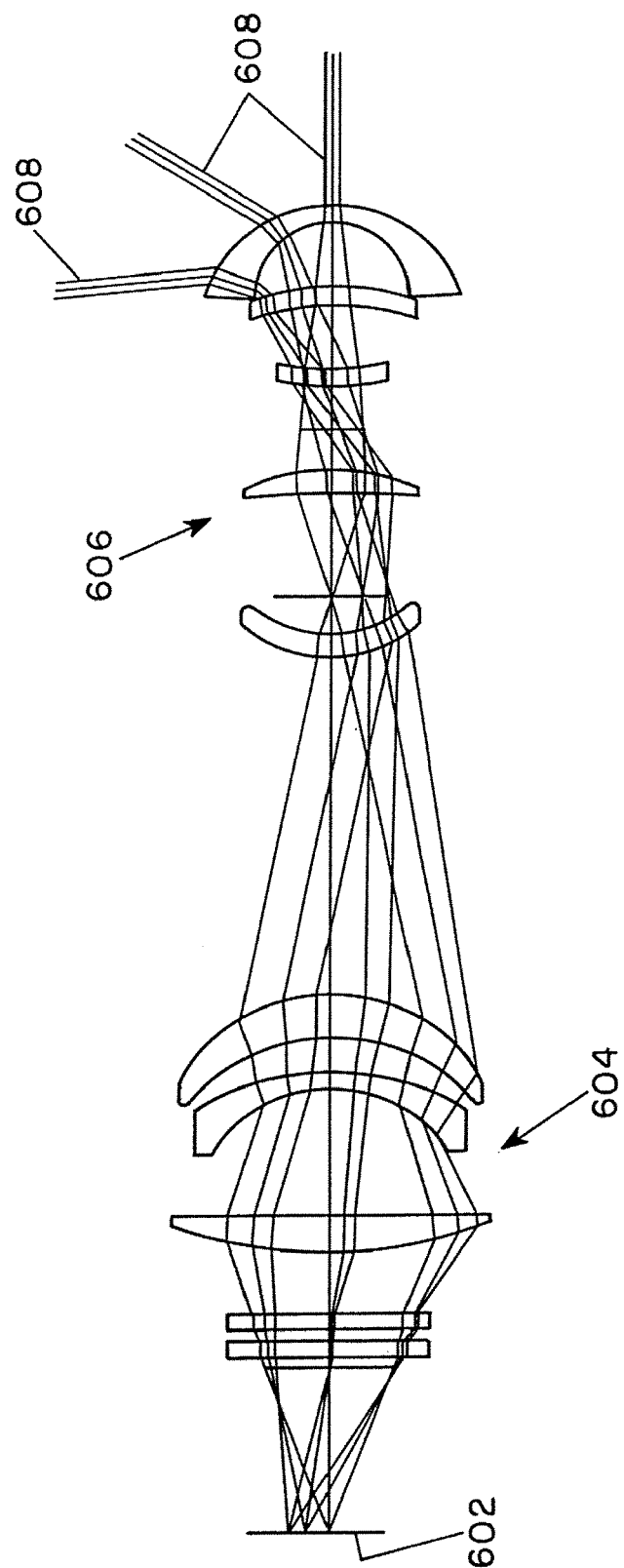
FIG. 6 is a diagram illustrating an exemplary lens-based non-single viewpoint imaging system.
Figure 7A:
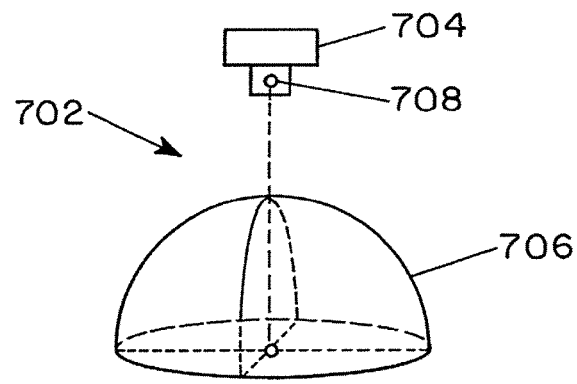
FIG. 7A is a diagram illustrating an exemplary non-single viewpoint imaging system employing a reflector.
Figure 7B:
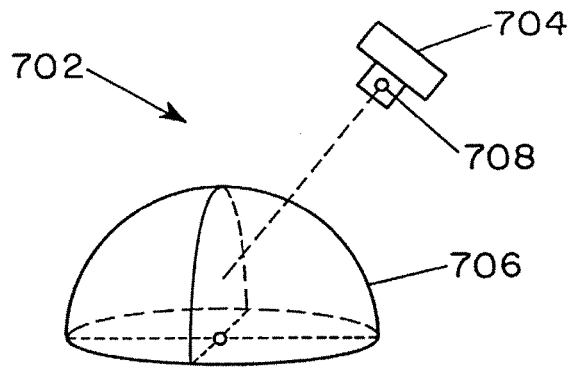
FIG. 7B is a diagram illustrating an additional exemplary non-single viewpoint imaging system employing a reflector.
Figure 7C:
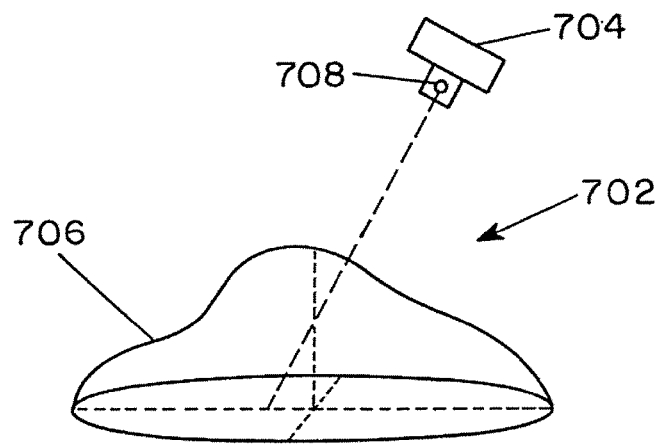
FIG. 7C is a diagram illustrating another exemplary non-single viewpoint imaging system employing a reflector.

FIG. 4 illustrates an example of the step 312, illustrated in FIG. 3, for generating a projection representing a scene. First and second rays of a ray surface are determined based on the geometry of the image-sensing system (steps 402 and 404). Using information regarding the geometry of the image-sensing system, and statistical information regarding the depths of scene features, an estimated location for a first point within the projection is determined, the first point within the projection being the location within the projection which will represent the first scene region (step 406). Similarly, a second estimated location is determined (step 408), the second estimated location corresponding to a second pixel representing a second scene region. A first part of the projection is generated by assigning the brightness value of the first pixel to the first estimated location (step 410). Similarly, a second part of the projection is generated by assigning the brightness value of the second pixel to the second estimated location within the projection (step 412).

In order to perform the above-described procedure for estimating the location of a pixel within a perspective projection, it is advantageous to model the depth distributions of typical scenes in order to provide an appropriate depth distribution function for use in the estimation procedure. Several methods for generating depth distributions are described as follows.

Figure 14A:
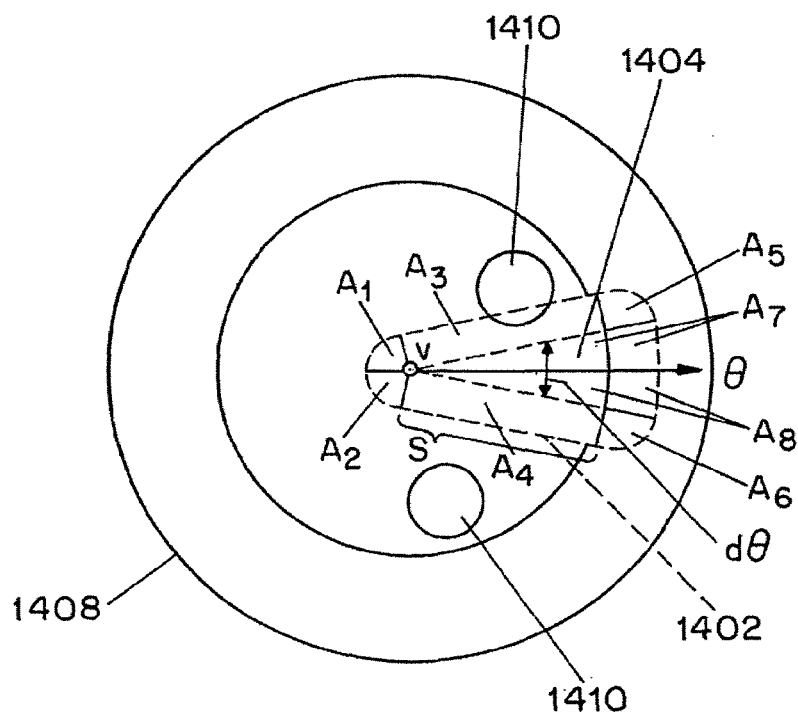
FIG. 14A is a diagram illustrating an exemplary procedure for determining a scene depth distribution in accordance with the present invention.

For example, consider a scene in two dimensions, in which it is known that all objects reside within a circular room centered on a viewpoint O and having a radius R. An example of such a scene is illustrated in FIG. 14A. Objects 1410 in the scene are modeled as circles each having a radius r. The objects are assumed to be uniformly distributed within the room 1408. The goal in this case is to compute the probability with which an observer can see, without occlusion by an object 1410, up to a distance s in a direction θ within an angular field of view dθ.

An occlusion occurs when some part of an object 1410 (circles, in this case) falls within the field of view. As illustrated in FIG. 14A, this occurs only when the center of the object 1410 lies within a certain exclusion perimeter 1402 around the field of view 1404. For the case in which the observer is not inside any of the objects 1410, and in which s≧2r, the area inside the exclusion perimeter 1402 is essentially the sum of multiple regions given by $$A_{perim} = (A_1 + A_2 + A_3 + A_4 + A_5 + A_6 + A_7 + A_8). \quad (8)$$

where:

$$A_1 = A_2 = \frac{(\pi - d\theta)r^2}{4} \quad (9)$$

$$A_3 = A_4 = s \cdot r \quad (10)$$

$$A_5 = A_6 = \frac{\pi r^2}{4} \quad (11)$$

$$A_7 = A_8 = \frac{d\theta \cdot (s+r)^2}{4} \quad (12)$$

The area of the bounded region 1408 (e.g., the room) is given by $A_{total} = \pi \cdot R^2$. If X denotes the situation in which s is the un-occluded distance in direction θ with a field of view having an angle of dθ, then:

$$P(X) = \frac{A_{total} - A_{perim}}{A_{total}} \quad (13)$$

$$P(\theta, d\theta, s, r, R) = 1 - \frac{2\pi r^2 + 4sr + d\theta s^2 + 2d\theta sr}{2\pi R^2} \quad (14)$$

where P(X) denotes the probability of situation X occurring. Note that this computation holds true for all dθ<π and for only one circle. For N circles uniformly distributed within the bounded region, the probability is given by:

$$P(\theta, d\theta, s, r, R, N) = \left(1 - \frac{2\pi r^2 + 4sr + d\theta s^2 + 2d\theta sr}{2\pi R^2}\right)^N \quad (15)$$

Figure 14B:
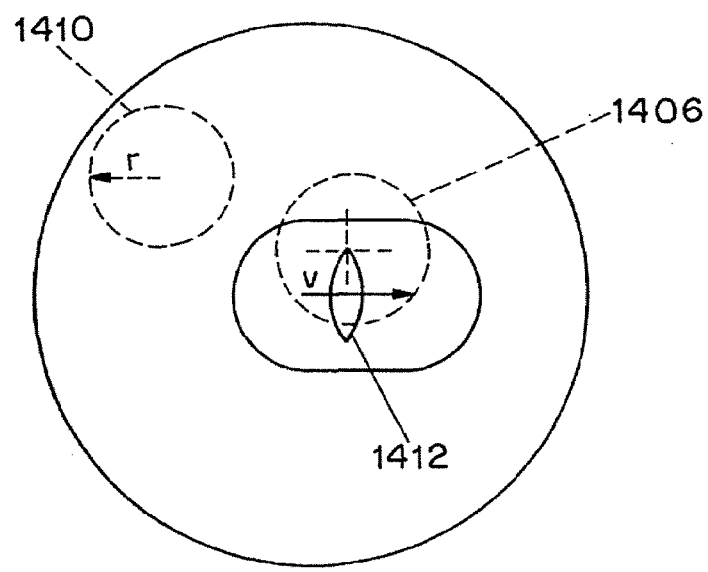
FIG. 14B is a diagram illustrating an additional exemplary procedure for determining a scene depth distribution in accordance with the present invention.

In addition, as illustrated in FIG. 14B, if s<2r, it is possible for an observer to be inside an object (or room) 1406. For this case, if s<2r, there is a region 1412 in which the center of the object 1406 must lie in order not to obstruct the observer's view within a distance s in a given direction. The area of this region 1412 is:

$$A_{hole} = 2r^2 \tan^{-1}\left(\frac{\sqrt{4r^2 - s^2}}{s}\right) - \frac{s\sqrt{4r^2 - s^2}}{2} \quad (16)$$

The probability distribution of occlusion at distance s is then given by:

$$P_{s<2r}(X) = \frac{A_{total} - (A_{shaded} - A_{hole})}{A_{total}} \quad (17)$$

This probability distribution equals the probability distribution of scene depth, because scene depth in a particular direction is defined as the distance that a ray in that direction can be extended from the viewpoint without intersecting an object. For N objects, the probability is:

$$P_{s<2r}(X) = \left(1 - \frac{2\pi r^2 + 4sr - 4r^2 \tan^{-1}\left(\frac{\sqrt{4r^2 - s^2}}{s}\right) + s\sqrt{4r^2 - s^2}}{2\pi R^2}\right)^N \quad (18)$$

To perform the calculation for a three-dimensional, spherical chamber, the system illustrated in FIG. 14A is simply rotated about the axis of symmetry of the shaded region (i.e., along the viewing direction θ).

In addition, the depth distribution can be estimated numerically, e.g., by using a computer to simulate a scene. Such a procedure is performed by using a computer algorithm to mathematically generate objects of randomized sizes, shapes, and orientations within some finite scene space. Given a particular viewing direction and field of view, the algorithm computes the maximum distance s up to which the view is un-occluded. Multiple samples of s are collected with each simulation, in order to generate the simulated distribution of s.

An additional approach for estimating the depth distribution is to utilize actual, real-scene range data acquired using, for example, a range scanner or similar instrument. It is assumed that all data collected is statistically independent, and thus represents a good statistical measure of distances of scene objects from a viewpoint. In addition, range data can be segregated into categories such as indoor, outdoor, urban, rural, and/or even microscopic types. This can help to compute more accurate distributions for each case.

In most cases, the above-described methods for generating an estimated perspective projection 1112 will not yield a perfectly undistorted image of the scene, even if scene depth distribution information is available. In fact, the amount of distortion remaining in the perspective projection 1112 tends to depend upon the choice of virtual viewpoint O'. Therefore, an algorithm in accordance with the present invention is used to select a virtual viewpoint O' which results in a perspective projection 1112 having the lowest possible amount of distortion. In order to enable a suitable virtual viewpoint O' to be selected, the algorithm uses one or more techniques for measuring perspective distortion. Examples of such distortion measuring techniques are described below.

Figure 15:
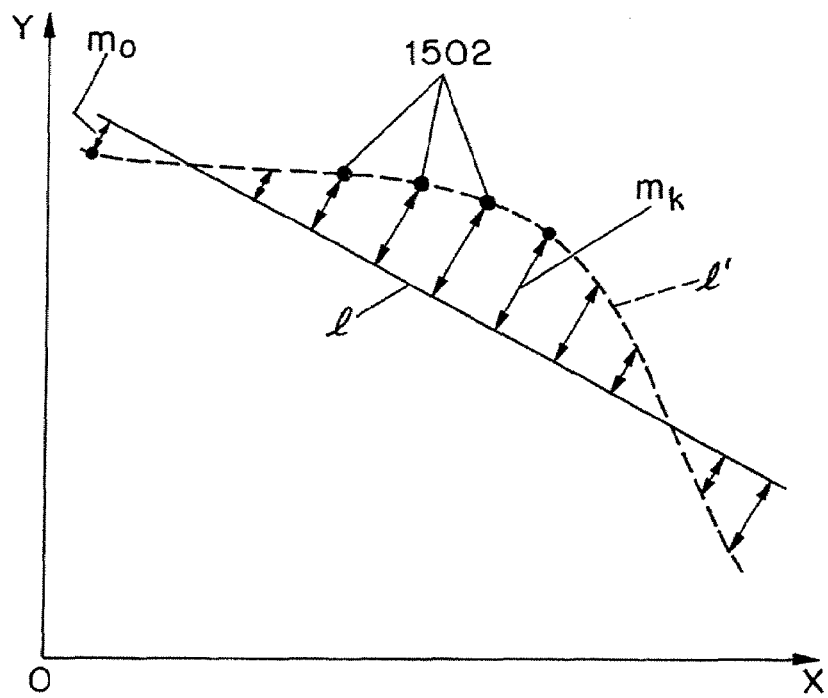
FIG. 15 is a graph illustrating an exemplary method for measuring distortion in accordance with the present invention.

Under true perspective projection, a straight line in the scene maps to a straight line in the image. However, as illustrated in FIG. 15, distortions cause a scene line l to appear as a curve l' under perspective projection. Yet, merely because some set of scene lines maps to straight lines in the image does not necessarily mean that the imaging system induces no distortions. For instance, consider a fish-eye lens, which is known to have strong radial distortions. Despite these distortions, any scene line whose projection passes through the optical center of the image appears as a straight line in the image. An imaging system is distortion free if, and only if, all straight lines in the scene map to straight lines under perspective projections. Thus, as illustrated in FIG. 15, any quantitative measure of curvature—such as the distance(s) $m_k$ from points 1502 on a curve l' to the correct line l—can serve as a quantitative measure of distortion.

The notion of distortion can be formalized as follows. Let C be a sequence of k points in the scene. Such a configuration can be referred to as a "configuration" of points. Let γ denote the set of such configurations—i.e., C∈γ. $f$ is defined as a function of γ, which receives a configuration C and maps the configuration C to a real number. An example of $f$ can be the cross ratio between four collinear points, which is "projectively invariant"—i.e., does not vary under projective transformation. When the points are collinear, $f$ vanishes. In both these cases, $f$ is not projectively invariant as applied to all configurations of points, but only as applied to a certain class of configurations. Suppose, for example, that $f$ is a function applied to configurations for which it is invariant under projective transformations. If T is any projective transformation acting on C∈γ, and γ is closed—i.e., T(C)∈γ—then:

$$f(T(C))=f(\gamma) \quad (20)$$

The above equation formalizes the constraint that $f$ is projectively invariant. Thus, the value of the function $f$ computed at C is equal to that computed at the projective transform of C—i.e., τ(C).

An exemplary procedure for measuring image distortion can be understood by considering an imaging and distortion reducing system in which, for a set of scene points in a configuration $C_i$, τ is the map from the scene points to the final, reduced-distortion image. The distortion remaining in the final image is measured by determining how close τ is to being a true projective map T. Eq. (20) holds only when τ is, in fact, projective. Therefore, a simple measure of the distortion in the final image is:

$$m_i = f(\tau(C_i)) - f(T(C_i)) \quad (21)$$

Note that mi vanishes when τ=T.

Objective functions are constructed by taking many measurements $m_i$ and averaging them with one of a family of norms. For a large number N of configurations, let $\{(f_i, C_i)\}_{1 \leq i \leq N}$ be a set of pairs of functions and configurations which are invariant under perspective projection. The N measurements are $m_i = f_i(\tau(C_i)) - f(C_i)$. If $M=(m_o \ldots m_N)$ is a vector of N measurements, then an appropriate objective function is given by the p norm $m_p$. To select the best virtual viewpoint—i.e., the virtual viewpoint giving rise to the least amount of distortion—an algorithm in accordance with the present invention uses a numerical method such as a minimum-searching procedure to find the viewpoint for which the objective function has a minimum. In addition, each measure can be weighted by its probability of accuracy. This objective function ξp,m, which is a variant of the p norm, is given by:

$$\xi_{p,m} = \|m\|_{p,w} = \left(\sum_{i=1}^{N}(wi \cdot |mi|^p)\right)^{1/p} \quad (22)$$

where $w_i$ is the weight associated with the corresponding measure $m_i$ and $\Sigma w_i=1$. The infinity norm ξ∞ is given by:

$$\xi_\infty = \|m\|_\infty = \max(w_i \cdot m_i)_{1 \leq i \leq N} \quad (23)$$

In order to make the objective functions resilient to noise, robust statistical techniques can be used. For instance, the well-known RANSAC technique increases robustness by discarding outliers. Additional techniques include using the median, rather than the mean, of the N measures:

$$\xi_{median} = \text{median}(w_i \cdot m_i)_{1 \leq i \leq N} \quad (24)$$

An additional distortion measuring method uses scene points to compute the error measure. In general, any invariant under perspective projection—such as the cross ratio—can be used.

Figure 16:
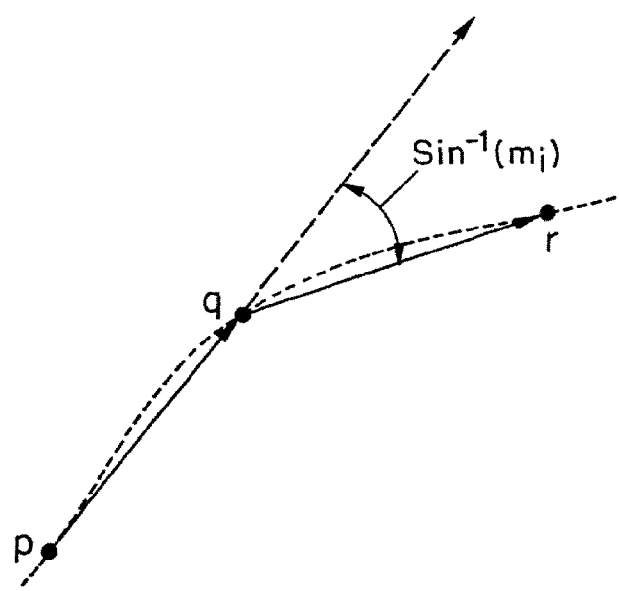
FIG. 16 is a diagram illustrating an additional exemplary method for measuring distortion in accordance with the present invention.

For example, consider the configuration formed by triplets of collinear scene points $C_i$. Such a configuration is illustrated in FIG. 16. The image of these scene points is given by τ($C_i$)={p, q, r}. It is well known that the cross product of any two vectors between three collinear points must be zero. This constraint yields the following formulation for quantifying distortion among three points:

$$m_i = \frac{|\overrightarrow{pq} \times \overrightarrow{qr}|}{|\overrightarrow{pq}| \cdot |\overrightarrow{qr}|} \quad (25)$$

If the geometry of the scene is known, then the three-dimensional locations of scene points can be used to define a measure of distortion. The scene points need not be collinear. Consider, for example, an arbitrary set of known scene points, and define a configuration $C_i$ to consist of a single scene point. Let τ represent the entire imaging system's mapping from scene points onto some ultimate projection surface. The mapping τ generates an image point τ($C_i$) on the projection surface. From a selected virtual viewpoint, if scene points with known depths are accurately projected onto the same projection surface, this true perspective projection can be denoted as T. The error metric can now be defined as a measure of the distance between the image point τ($C_i$) and the correct projection T($C_i$) of the scene point $C_i$. Such an error metric can be expressed as follows:

$$m_i = dist(\tau(C_i) - T(C_i))_{1 \leq i \leq N} \quad (26)$$

where N represents the number of points in the scene and $dist(P_a - P_b)$ measures the distance between two points $P_a$ and $P_b$ on the projection surface. For N measurements, a vector of measures $M=\{m_1, m_2, \ldots, M_N\}$ is generated. The objective function which is to be minimized is defined as a p-norm of this vector:

$$\xi_{projective} = |M|_p \quad (27)$$

$$\xi_{projective} = \left(\sum_{\forall i}(m_i)^p\right)^{\frac{1}{p}} \quad (28)$$

A virtual viewpoint selection algorithm in accordance with the invention can employ distortion measures and objective functions based upon distortion of straight lines in the scene. Under true perspective projection, such straight scene lines should map to straight lines in the image. Let $C_i$ be a set of collinear points—i.e., points on the same line—within the scene. The image τ($C_i$) of $C_i$ should, in a true perspective projection, be a configuration of collinear points. The function $f(C_i)$ (discussed above) can be constrained to vanish for all $C_i$. Such a constraint can be expressed as $f(\tau(C_i))=0$.

The value of the function $f$ is defined as the distance of a point in $C_i$ from the best fit line estimated from $C_i$. Thus $f$ vanishes when all the points are collinear. Let $\lambda_1(C_i)$ and $\lambda_2(C_i)$ be estimates of the two parameters of the best-fit line $\Lambda$. Thus, $\lambda_1, \lambda_2: C \mathbb{R}$. Let the $j^{th}$ point in $\tau(C)$ be $q_j=(x_j, y_j)$. The distance $d_j$ of the selected points from the line $\Lambda$ is:

$$d_j = (X_j \cdot \sin(\lambda_1(C_i))) - y_j \cdot \cos(\lambda_1(C_i) + \lambda_2(C_i))) \quad (29)$$

Let the distances of all points in $C_i$ to the best fit line $\Lambda$ be represented by the vector $D = \{d_1(C_i), d_2(C_i), \ldots, d_j(C_i), \ldots d_k(C_i)\}$. The function $f$ can be defined as a p-norm of the above vector:

$$mi = f(C_i) = \|d\|_p \quad (30)$$

Similarly to the objective functions discussed above, an objective function based upon Eq. (30) can be made more statistically robust by employing techniques such as RANSAC, or by using the median, rather than the mean, of the errors associated with the various points.

An additional distortion-measuring method sums the absolute values of distances ($d_j$ in D) of the respective points from $\Lambda$. the sum can also be referred to as the infinity norm or the $L_1$-norm of the error vector d. The $L_1$-norm is defined as:

$$m_i = \sum_{\forall q_j \in \tau(C_i)} \mathrm{abs}(d_j) \quad (31)$$

$$\xi_{1,1} = \sum_{\forall i} m_i$$

where $\xi_{l,1}$ represents the objective function to be minimized.

The above metric is useful for the case when all configurations have the same number of points in them. However, in some cases, the various configurations have different numbers of points, and as a result, some lines contribute, more than other lines, to the total error. In order to compensate for this effect, the algorithm preferably uses, as a normalization factor, the number of points in each configuration $C_i$, denoted as $C_i$. The distortion is then defined as:

$$m_i = \sum_{\forall ij \in \tau(Ci)} \mathrm{abs}(d_j) \quad (32)$$

$$\xi_{1,|C|} = \sum_{\forall i} \frac{m_i}{|C_i|}$$

The formulations discussed above use the absolute operator, which is not linear. Yet, the $L_2$-norm lends itself to linear solutions. The error measure $m_i$ can be formulated using the $L_2$-norm as follows:

$$m_i = \sum_{\forall q_j \in \tau(Ci)} d_j^2 \quad (33)$$

$$\xi_{2,|c|} = \sum_{\forall i} \frac{m_i}{|C_i|}$$

The above formulation treats all lines equally and does not weight them by any measure of quality. However, in some cases, it is preferable to weight the error contribution of each line differently. For example, if the imaging system has a spatially varying resolution, the resolution of a line can be used to weight the contributions of that line. Thus, lines imaged at higher resolutions contribute more to the error metric than do lower resolution lines. Let the weights be denoted by $w_i: i \in [1, N]$. The objective function is then defined as:

$$m_i = \sum_{\forall q_j \in \tau(C_i)} d_j^2 \quad (34)$$

$$\xi_{2,\frac{r}{|C|}} = \sum_{\forall i} \left(\frac{w_i}{|C_i|} \cdot m_i\right), \text{ where } \sum_{\forall i} w_i = 1.$$

One potential drawback associated with using an average as a metric is that averages tend to be susceptible to noise. In contrast, medians tend to be comparatively less susceptible to noise. An exemplary objective function $\xi$ using the median of the squares of the spatial errors $d_j$ is defined as follows:

$$m_i = \mathrm{median}_{\forall q_j \in \tau(Ci)}(d_j^2) \quad (35)$$

$$\xi_{median,l} = \sum_{\forall i} m_i$$

The objective function $\xi$ can be modified by weighting the error contributions of each line differently. Let the set of weights associated with each line be denoted as $w_i: i \in [1, N]$. The objective function $\xi$ is then defined as follows:

$$m_i = \mathrm{median}_{\forall q_j \in \tau(Ci)}(d_j^2) \quad (36)$$

$$\xi_{median\_jr} = \sum_{\forall i} w_i \cdot m_i \text{ where } \sum_{\forall i} w_i = 1.$$

It is to be noted that a distortion-reducing algorithm in accordance with the present invention is not limited to the distortion measures discussed above. In general, any function which measures an invariant under perspective projection can be used.

If an explicit mathematical expression—such as, for example, a Gaussian equation—is available to describe the probability distribution of scene depths, the explicit scene depth distribution expression (illustrated as item 1308 in FIG. 13) can be converted into an explicit expression for the probability distribution 1310 of the true pixel location p' as a function of position within a perspective projection 1112. For example, for each chief ray 812, the geometry of the imaging system and the selected virtual viewpoint O' can be used to generate an equation representing scene point depth as a function $\delta(\vec{\rho}, O')$ of: (a) the position $\vec{\rho}$ of a pixel within the perspective projection, and (2) the location O' of the virtual viewpoint. Plugging the expression for $\delta(\vec{\rho}, O')$ (depth vs. pixel position) into the scene depth distribution equation yields an expression for the probability distribution 1310 of p' versus position ρ within the perspective projection 1112. This expression can now be plugged into any one of the objective functions discussed above to yield an objective function which is an explicit function of the position O' of the virtual viewpoint. The best virtual viewpoint is the one which minimizes the resulting objective function.

In addition, if an explicit equation for the scene depth distribution 1308 is unavailable, but a set of simulated or measured depths is available, then the set of depths can be used to perform a numerical optimization of virtual viewpoint location, by simulating objective function computations for a number of virtual viewpoint locations. Numerical methods for finding the minimum of a function are well known.

An objective function minimization procedure can be used, not only to select a virtual viewpoint, but to optimize any model or mapping G which is used to reduce distortion of images. Such a procedure can, for example, employ an explicit mathematical expression describing scene depth distribution. The distortion-reducing mapping function G—which has one or more model parameters which can be optimized—is plugged into the scene depth distribution equation in order to generate an explicit mathematical expression for the probability distribution associated with each location on an image processed using the distortion reduction mapping function. This mathematical expression is then plugged into any one of the objective function equations discussed above, thereby generating a single expression representing approximate image distortion as a function of the model parameters. The optimal values of the model parameters are the values which minimize the objective function. Several exemplary models are discussed below in the context of a radially symmetric imaging system, in which distortions only exist in the radial dimension. In such a system, morphing the raw image only in the radial direction is sufficient to correct for the aforementioned radial distortions.

Finding a morph G that removes the distortion in an image amounts to finding the right parameter values for the morph G. If there is very little information available regarding the possible depths at which scene points may be located, it is preferable to assess how well G performs for a wide variety of images. For example, it may be important for G to perform well, on average, for all images, or it may be more important for the worst case performance to be as good as possible.

If G is performing well for removing distortions, then for a particular configuration of points in three-dimensional space, such as points on a line, points on a circle, or points forming a square, the perspective images of these points should retain certain properties. For example, scene points on a circle in three-dimensional space should be represented by points along an ellipse or circle in a true perspective image of the scene. A set of scene points on a line in three-dimensional space should be represented by points along a line in a perspective image. An algorithm in accordance with the present invention generates a number which quantifies how badly a set of image points fails to satisfy the above criteria. For many types of geometric configurations of scene points, such a function effectively measures the degree to which an image of those scene points is perspective, thereby indicating how well G performs for removing distortions.

A configuration type, such as straight lines, and a measure of straightness, such as Eq. (30) can be used to measure the performance of the morphing function G. For example, suppose that it is known that all objects are between 5 and 15 meters away from the imaging device, and the depth distribution associated with the objects is a spherical Gaussian function having an average distance value of 10 meters. The Gaussian function can be truncated at 5 and 15 meter limits. The performance of the morph G can, for example, be measured using the following procedure/algorithm. A line segment having a particular length (e.g., 1 meter) is provided. A number (e.g., 10) of equally spaced points are located on the line segment. A center location of the line segment is selected randomly according to the depth distribution. An orientation (i.e., a direction) of the line segment is selected according to a uniform distribution. The algorithm determines the position within an initial image, corresponding to each scene point. The location of each initial image point is adjusted using the morph G, which has the current morph parameters. An error measure, such as Eq. (30), is used to generate a number $m_i$ representing the straightness of the line in the morphed image. This number is stored. The process of choosing a line is iterated repeatedly, each iteration including the steps of determining the morphed line and measuring its straightness to obtain a number value. After many (e.g., 1,000,000) iterations, the stored straightness values are added and/or averaged to generate the value $\xi$ of an object function. This value $\xi$ represents a measure of the degree to which straight scene lines remain straight in the image using the morph G.

The parameters of G are optimized so that $\xi$ is minimized. This optimization may be done by a "brute force" numerical search, or any of numerous well-known optimization techniques.

An example of a morph function which can be used is a polynomial warp function G. The function G can be applied either to the acquired image or to any representation thereof—for example, a spherical panorama. If r measures the distance of points along the dimensions of distortions, the model is given by:

$$G(r) = \sum_{i \in (0,N)} \xi_i r^i \tag{37}$$

where N is the degree of the polynomial. The parameters of this model G are the coefficients $\xi_i$ of the polynomial. The set of coefficients which produce the least perspectively-distorted view are used to model the transformation.

Figure 17:
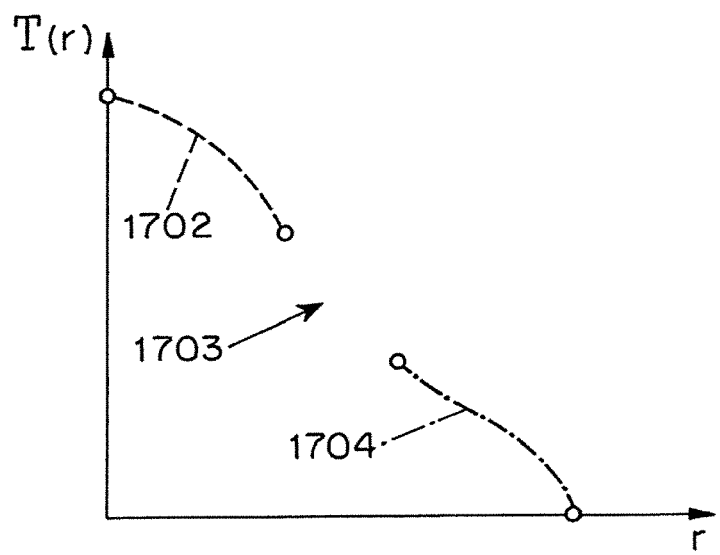
FIG. 17 is a graph illustrating the operation of an exemplary model for reducing image distortion in a non-single viewpoint imaging system in accordance with the present invention.

The polynomial model is typically effective for systems having smoothly varying ray-image maps. For systems having discontinuous maps, piece-wise models can be used for the transformations. Each locally smooth piece can be modeled, for example, by a polynomial, a spline, a B-spline, or a cubic spline. FIG. 17 illustrates an example of a piecewise map made of multiple smooth curves 1702, 1703, and 1704.

Asymmetric imaging systems can be viewed as a more general case. Asymmetry of a system can be defined in terms of the radial asymmetry of the ray-image map. Due to asymmetry, distortions are present in two dimensions. Thus, the transformation G should be defined as a vector valued function which maps image points to their new locations.

Let the image points be parameterized by (r, θ), where r is real and θ∈[0, 2π]. The transformation G maps (r, θ) to (r', θ'), where r' is real and θ'∈[0, 2π]. G can be defined in terms of two scalar valued functions $G_r$ and $G_\theta$, such that $G_r$: (r, θ)→r' and $G_\theta$: (r, θ)→θ'. Each of these scalar valued functions can be modeled as either smooth continuous functions or as piecewise functions.

If transformation cannot be assumed to be locally smooth, discrete maps are preferably used. Every pixel in the acquired image is thus mapped to another location using a lookup table. However, the use of discrete lookup tables is not restricted to non-smooth transformations; a smooth transformation can be discretized and represented as a lookup table in order to enhance the performance of image rendering. Since the transformations are invariant to motions such as rotation and/or translation of the imaging system as a whole, a map can be computed once and stored as a lookup table for future use of view creation.

Once the form of a transformation (i.e., morphing function) is determined, there are several ways to optimize the parameters of the transformation function. The goal is to estimate the set of parameters for which the transformation function produces the least distorted view. The amount of distortion in a computed view can be quantized using the objective measures discussed above. The transformation map G is chosen depending on the imaging system and its ray-image map.

Figure 18:
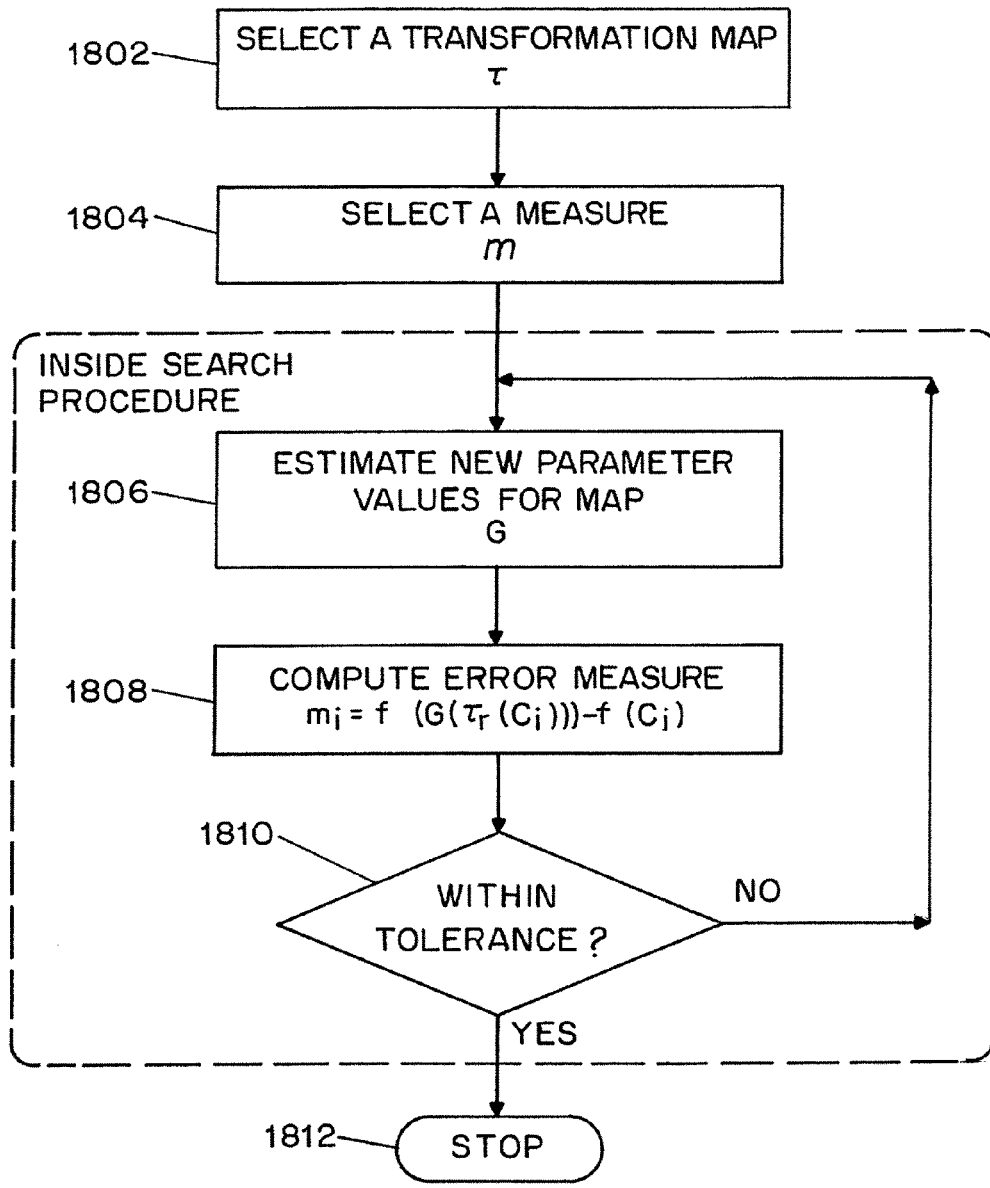
FIG. 18 is a flow diagram illustrating an exemplary procedure for reducing image distortion in a non-single viewpoint imaging system in accordance with the present invention.

The optimization of the transformation parameters can be posed as a minimization problem. Depending on the transformation function and the distortion measure being used, this minimization is solved either linearly or by nonlinear search mechanisms. An exemplary non-linear search technique can be understood with reference to FIG. 18. Given an initial guess of the transformation parameters, the algorithm searches a selected parameter space region for a point which minimizes the degree of distortions. Let C denote the configuration of points used to measure the distortion. The form of a transformation map G is chosen (step 1802). A distortion measure m is also chosen (step 1804). At each iteration, the algorithm estimates a new parameter value to further reduce distortions (step 1806). These parameters warp the image of the configuration of points r(C). The algorithm then computes the error measure $\xi$=average $(m_i)$, where $m_i = f(G(\tau_r(C_i))) - f(C_i)$ (step 1808). This error measure $\xi$ is used to compute the next set of transformation parameters (i.e., in step 1806). When the termination condition is met (step 1810), the search terminates (step 1812), delivering the parameter set which produces the least distorted views.

Such a search can be carried out using various well-known methods contained in numerical libraries such as IMSL. Typical search methods include the simplex search or direct search methods. When the measure function is analytically differentiable, gradient based methods such as the LM-algorithm can be used. In cases when an analytical gradient is not available, numerically estimated finite difference gradients can be used.

Figure 19:
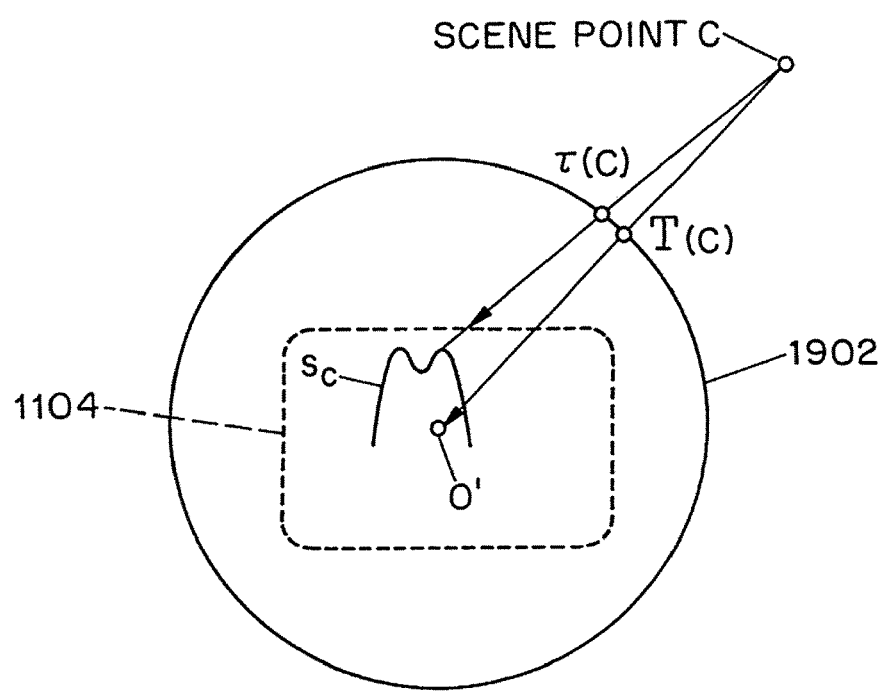
FIG. 19 is a diagram illustrating the operation of an exemplary non-single viewpoint imaging system in accordance with the present invention.

Transformation map optimization using linear parameter estimation can be understood with reference to the following example, illustrated in FIG. 19. A rotationally symmetric imaging system 1104 is assumed, wherein distortions occur only in the radial direction. The transformation function is modeled as a polynomial of degree K. To linearize the problem, the error metric defined in Eq. 26 is used.

The transformation parameters are estimated using information regarding the scene structure. Either a known scene or a scene depth distribution can be used. In addition, synthetic scenes can be artificially generated in order to statistically represent a real scene. Such synthetic scenes can, for example, be generated off-line and used to compute the transformation parameters. Synthetic scene points are randomly generated around the virtual viewpoint O' using an appropriate scene depth distribution function. The resulting simulated scene points now form the desired configuration of scene points $C_i \forall 1 \leq j \leq N$ where N denotes the number of scene points.

Figure 20A:
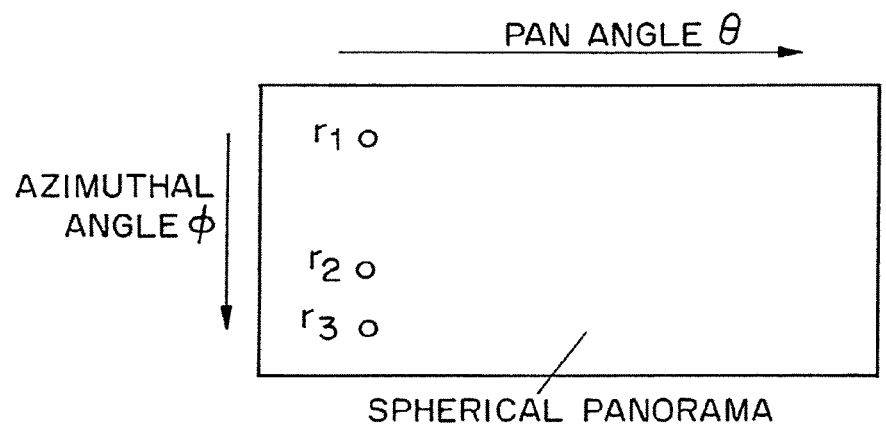
FIG. 20A is a diagram illustrating an image being processed by an exemplary distortion-reducing procedure in accordance with the present invention.
Figure 20B:
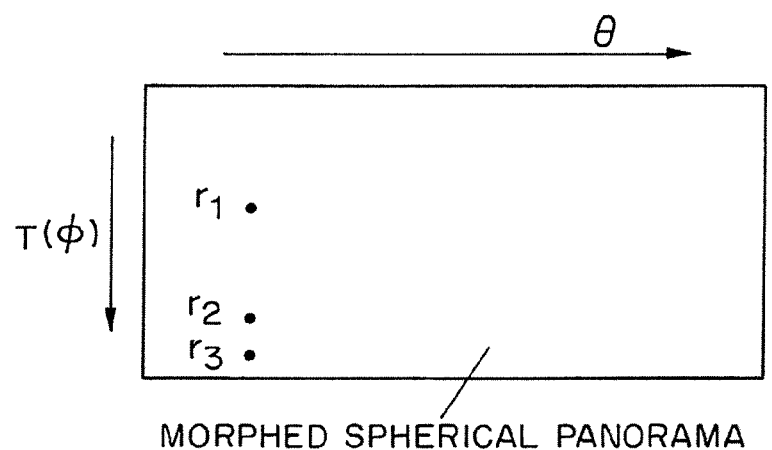
FIG. 20B is a diagram illustrating an image generated by processing the image of FIG. 20A using an exemplary distortion-reducing procedure in accordance with the present invention.
Figure 20C:
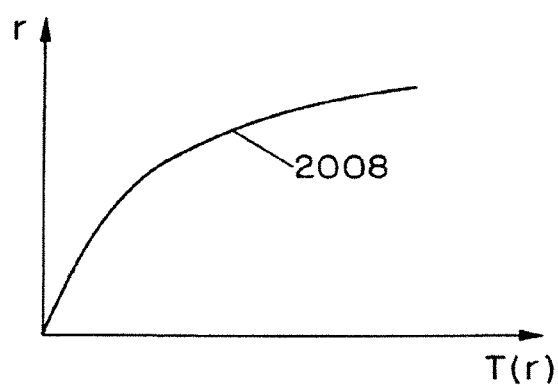
FIG. 20C is a graph illustrating an exemplary transformation map between the images illustrated in FIGS. 20A and 20B.

The geometry of the imaging system is also assumed to be known. Let $\tau$ represent the imaging system map—including the distortion reduction transformation G—which projects scene points onto a projection surface (e.g., a spherical panorama 1902) centered on the virtual viewpoint O'. The spherical panorama 1902 is represented by a discrete lookup table parameterized according to the pan and azimuthal angles $\theta$, $\phi \in [0.2\pi]$, as illustrated in FIGS. 20A and 20B. Distortions thus occur only along the azimuthal angle $\phi$. Let $r:\phi \rightarrow \mathbb{R}$ denote the distance of a point in the lookup table along $\phi$. For each scene point, the distance is denoted as $\tau_r(C_i)$. The transformation function G (item 2008, illustrated in FIG. 20B) is defined as a polynomial in terms of r. The undistorted azimuthal position of a point is given by:

$$G(r) = \sum_{i=0}^{K} (\xi_i r^i). \tag{38}$$

where $\xi_i$ denotes the parameters of the transformation map G. Let T denote a true perspective map of scene points onto the spherical panorama 1902, based on the virtual viewpoint O'. The azimuthal distance for this ideal projection is given by $T_r(\cdot)$.

The measure of true perspective errors described in Eq. (26) is used as the error metric. The error to be minimized is thus given by:

$$\xi_{perspective} = (G(\tau_r(C_j)) - T_r(C_j))^2 \forall 1 \leq j \leq N \tag{39}$$

In order to minimize $\xi$, the algorithm takes partial derivatives with respect to all the coefficients $\{\xi_0, \ldots \xi_K\}$ to arrive at the following constraint equation:

$$\xi_0 + \xi_1 \tau_r(C_j)^1 + \ldots + \xi_K \tau_r(C_j)^K = T_r(C_j) \forall 1 \leq j \leq N \tag{40}$$

The only unknowns in the above linear equation are the coefficients of the transformation map. Therefore, the equation can be solved linearly, without any need for a search routine. For a polynomial model of degree K there are K+1 unknowns. Each synthetically generated point in space provides one constraint. Therefore, the model uses at least N=K+1 scene points to solve for a unique solution. For additional robustness, an overdetermined system of equations can be used to estimate the morph parameters of G.

It will be appreciated by those skilled in the art that the methods of FIGS. 1-4, 12, and 18 can be implemented on various standard computer platforms operating under the control of suitable software defined by FIGS. 1-4, 12, and 18. In some cases, dedicated computer hardware, such as a peripheral card in a conventional personal computer, can enhance the operational efficiency of the above methods.

Figure 22:
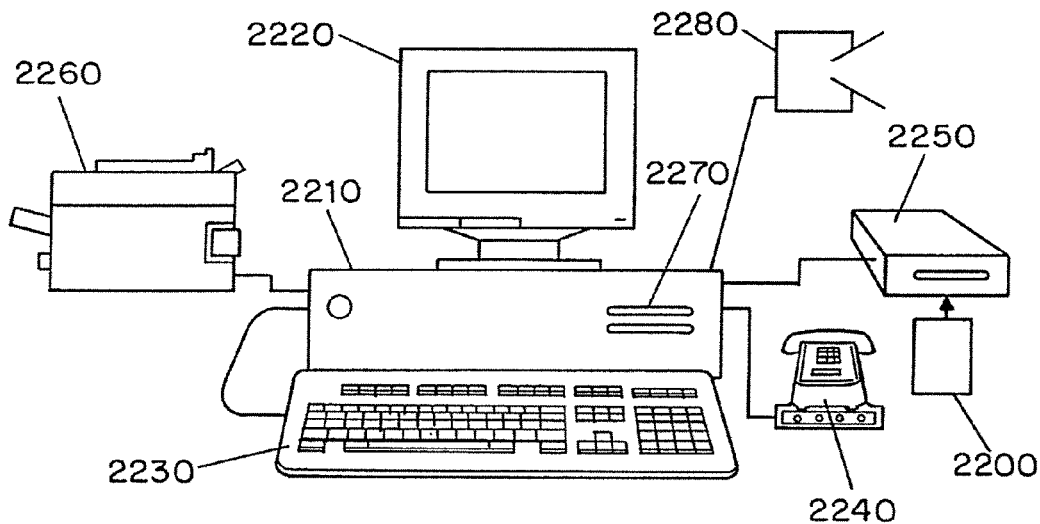
FIG. 22 is a diagram illustrating an exemplary computer system for performing algorithms for reducing image distortion in a non-single viewpoint imaging system in accordance with the present invention.
Figure 23:
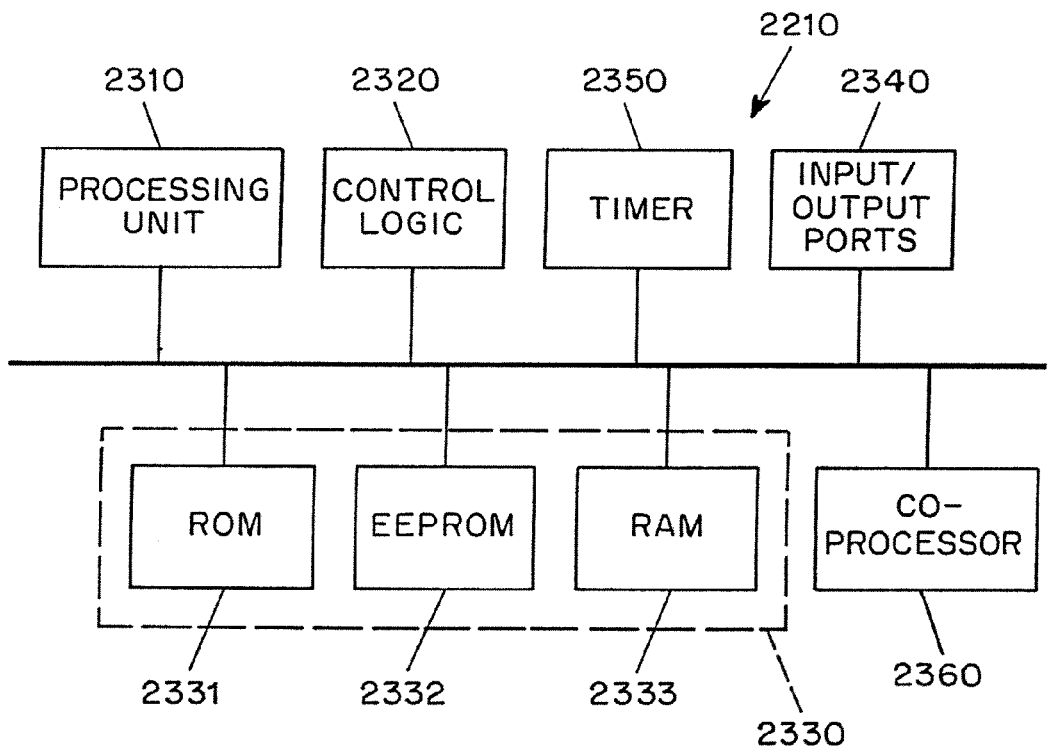
FIG. 23 is a block diagram illustrating an exemplary processor section for use in the computer system of FIG. 22.

FIGS. 22 and 23 illustrate typical computer hardware suitable for practicing the present invention. Referring to FIG. 22, the computer system includes a processor section 2210, a display 2220, a keyboard 2230, and a communications peripheral device 2240 such as a modem. The system can also include other input devices such as an optical scanner 2250 for scanning an image medium 2200. In addition, the system can include a printer 2260. The computer system typically includes one or more disk drives 2270 which can read and write to computer readable media such as magnetic media (i.e., diskettes), or optical media (e.g., CD-ROMS or DVDs), for storing data and application software. An imaging system 2280—which can, for example, be a dioptric, catoptric, or catadioptric system—can be used as a source of images to be processed by the computer. While not shown, other input devices, such as a digital pointer (e.g., a "mouse") and the like can also be included.

FIG. 23 is a functional block diagram which further illustrates the processing section 2210. The processing section 2210 generally includes a processing unit 2310, control logic 2320 and a memory unit 2330. Preferably, the processing section 2210 can also include a timer 2350 and input/output ports 2340. The processing section 2210 can also include a co-processor 2360, depending on the microprocessor used in the processing unit. Control logic 2320 provides, in conjunction with processing unit 2310, the control necessary to handle communications between memory unit 2330 and input/output ports 2340. Timer 2350 provides a timing reference signal for processing unit 2310 and control logic 2320. Co-processor 2360 provides an enhanced ability to perform complex computations in real time, such as those required by cryptographic algorithms.

The memory unit 2330 can include different types of memory, such as volatile and non-volatile memory and read-only and programmable memory. For example, as shown in FIG. 23, the memory unit 2330 can include read-only memory (ROM) 2331, electrically erasable programmable read-only memory (EEPROM) 2332, and random-access memory (RAM) 2333. Different computer processors, memory configurations, data structures and the like can be used to practice the present invention, and the invention is not limited to a specific platform. For example, although the processing section 2210 is illustrated in FIGS. 22 and 23 as part of a computer system, the processing section 2210 and/or its components can also be incorporated into an imaging system such as a digital video camera, a digital still-image camera, or any other imaging system.

Although the present invention has been described in connection with specific exemplary embodiments, it should be understood that various changes, substitutions, and alterations can be made to the disclosed embodiments without departing from the spirit and scope of the invention as set forth in the appended claims.

The invention claimed is:

1. A method for imaging, comprising:
  receiving an image generated by an image-sensing system having a plurality of viewpoints, the image being generated based upon radiation rays received by the image-sensing system, the radiation rays coming from a scene;
  using first information for selecting a virtual viewpoint for a projection representing the scene, the first information comprising information regarding a statistical distribution associated with at least one depth value of the scene, the virtual viewpoint being selected for reducing distortion of the projection; and
  using the image, the virtual viewpoint, and second information to generate the projection, the second information comprising information regarding at least one geometrical characteristic of the image-sensing system.

2. A method according to claim 1, further comprising using the first information to generate the projection.

3. A method according to claim 1, further comprising using the second information to select the virtual viewpoint.

4. A method according to claim 3, wherein the step of using the image, the virtual viewpoint, and the second information comprises:
  using the second information to determine a portion of a ray surface of the image-sensing system, the portion of the ray surface having first and second ray surface points, the first ray surface point being associated with a first pixel of the image, and being further associated with a first ray passing through a first scene region represented by the first pixel, the first ray further passing through the first ray surface point, the second ray surface point being associated with a second pixel of the image, and being further associated with a second ray passing through a second scene region represented by the second pixel, the second ray further passing through the second ray surface point;
  using the virtual viewpoint, the first ray, the first pixel, and the first information to determine a first estimated location within the projection, the first estimated location corresponding to a location of the first scene region;
  using the virtual viewpoint, the second ray, the second pixel, and the first information to determine a second estimated location within the projection, the second estimated location corresponding to a location of the second scene region, wherein the virtual viewpoint is selected for minimizing respective uncertainties of the first and second estimated locations, each one of the respective uncertainties representing one of: (a) a respective maximum size of first and second image regions within the projection, the first and second image regions corresponding respectively to the first and second scene regions, the first image region comprising a set of possible locations of the first estimated location, the second image region comprising a set of possible locations of the second estimated location, (b) a respective mean size of the first and second image regions, and (c) a total size of the first and second image regions; and
  using the first and second estimated locations and the image to generate the projection.

5. A method according to claim 1, wherein the at least one geometrical characteristic of the imaging system comprises one of:
  a spherical reflector characteristic;
  a hyperbolic reflector characteristic; and
  a parabolic reflector characteristic.

6. A method according to claim 1, wherein the projection is a perspective projection.

7. A method according to claim 1, wherein the projection represents a first portion of the scene and the virtual viewpoint is also for a further projection representing a second portion of the scene, the virtual viewpoint being further selected for reducing distortion of the further projection, and the method further comprising using the image, the virtual viewpoint, and the second information to generate the further projection.

8. A method according to claim 1, wherein the image-sensing system comprises at least two cameras.

9. A method for imaging, comprising:
  receiving an image generated by an image-sensing system having a plurality of viewpoints, the image being generated based upon radiation rays received by the image-sensing system, the radiation rays coming from a scene;
  using first information to determine a portion of a caustic of the image-sensing system, the first information comprising information regarding at least one geometrical characteristic of the image-sensing system;
  determining an average location of the portion of the caustic;
  selecting the average location as a first virtual viewpoint for a projection representing the scene; and using the image, the first virtual viewpoint, and the first information for generating the projection.

10. A method according to claim 9, further comprising using second information to perform an adjustment of the first virtual viewpoint, for generating a second virtual viewpoint for a further projection representing the scene, the second information comprising information regarding a distribution associated with at least one depth value of the scene, the projection having a first amount of distortion, the further projection having a second amount of distortion, the first amount of distortion being greater than the second amount of distortion.

11. A method according to claim 9, wherein the step of using the image, the first virtual viewpoint, and the first information comprises:
using the image and the first information to determine first and second rays, the first ray being associated with a first pixel of the image, and passing through a first scene region represented by the first pixel, the second ray being associated with a second pixel of the image, and passing through a second scene region represented by the second pixel;
using the virtual viewpoint, the first ray, the first pixel, and second information to determine a first estimated location within the projection, the first estimated location corresponding to the first pixel, and the second information comprising information regarding a statistical distribution associated with at least one depth value of the scene;
using the virtual viewpoint, the second ray, the second pixel, and the second information to determine a second estimated location within the projection, the second estimated location corresponding to the second pixel; and
using the first and second estimated locations and the image to generate the projection.

12. A method according to claim 9, wherein the at least one geometrical characteristic of the imaging system comprises one of:
a spherical reflector characteristic;
a hyperbolic reflector characteristic; and
a parabolic reflector characteristic.

13. An apparatus according to claim 12, wherein the projection is a perspective projection.

14. A method according to claim 9, wherein the projection is a perspective projection.

15. An imaging apparatus, comprising:
an image-sensing system for generating an image based upon radiation rays received by the image-sensing system, the radiation rays coming from a scene, the image-sensing system having a plurality of viewpoints;
a virtual viewpoint processor for using first information to select a virtual viewpoint for a projection representing the scene, the first information comprising information regarding a statistical distribution associated with at least one depth value of the scene, and the virtual viewpoint being selected for reducing distortion of the projection; and
an image processor for using the image, the virtual viewpoint, and second information to generate the projection, the second information comprising information regarding at least one geometrical characteristic of the image-sensing system.

16. An apparatus according to claim 15, wherein the image processor comprises a processor for using the first information to generate the projection.

17. An apparatus according to claim 15, wherein the virtual viewpoint processor comprises a processor for using the second information to select the virtual viewpoint.

18. An apparatus according to claim 17, wherein the image processor comprises:
a first processor for using the second information to determine a portion of a ray surface of the image-sensing system, the portion of the ray surface having first and second ray surface points, the first ray surface point being associated with a first pixel of the image, and being further associated with a first ray passing through a first scene region represented by the first pixel, the first ray further passing through the first ray surface point, the second ray surface point being associated with a second pixel of the image, and being further associated with a second ray passing through a second scene region represented by the second pixel, the second ray further passing through the second ray surface point;
a second processor for using the virtual viewpoint, the first ray, the first pixel, and the first information to determine a first estimated location within the projection, the first estimated location corresponding to a location of the first scene region;
a third processor for using the virtual viewpoint, the second ray, the second pixel, and the first information to determine a second estimated location within the projection, the second estimated location corresponding to a location of the second scene region, wherein the virtual viewpoint processor comprises a fourth processor for selecting the virtual viewpoint for minimizing respective uncertainties of the first and second estimated locations, each one of the respective uncertainties representing one of: (a) a respective maximum size of first and second image regions within the projection, the first and second image regions corresponding respectively to the first and second scene regions, the first image region comprising a set of possible locations of the first estimated location, the second image region comprising a set of possible locations of the second estimated location, (b) a respective mean size of the first and second image regions, and (c) a total size of the first and second image regions; and
a fifth processor for using the first and second estimated locations and the image to generate the projection.

19. An apparatus according to claim 15, wherein the at least one geometrical characteristic of the imaging system comprises one of:
a spherical reflector characteristic;
a hyperbolic reflector; and
a parabolic reflector characteristic.

20. An apparatus according to claim 15, wherein the projection represents a first portion of the scene, and the virtual viewpoint is also for a further projection representing a second portion of the scene, the virtual viewpoint processor comprising a first processor for selecting the virtual viewpoint for reducing distortion of the further projection, and the image processor comprising a second processor for using the image, the virtual viewpoint, and the second information to generate the further projection.

21. An apparatus according to claim 15, wherein the image-sensing system comprises at least two cameras.

22. An imaging apparatus, comprising:
an image-sensing system for generating an image based upon radiation rays received by the image-sensing system, the radiation rays coming from a scene, and the image-sensing system having a plurality of viewpoints;
a caustic determining processor for using first information to determine a portion of a caustic of the image-sensing system, the first information comprising information regarding at least one geometrical characteristic of the image-sensing system;
a caustic averaging processor for determining an average location of the portion of the caustic;
a virtual viewpoint processor for selecting the average location as a first virtual viewpoint for a projection representing the scene; and
an image processor for using the image, the first virtual viewpoint, and the first information for generating the projection.

23. An apparatus according to claim 22, further comprising a virtual viewpoint adjustment processor for using second information to perform an adjustment of the first virtual viewpoint, for generating a second virtual viewpoint for a further projection representing the scene, the second information comprising information regarding a distribution associated with at least one depth value of the scene, the projection having a first amount of distortion, the further projection having a second amount of distortion, the first amount of distortion being greater than the second amount of distortion.

24. An apparatus according to claim 22, wherein the image processor comprises:
a first processor for using the image and the first information to determine first and second rays, the first ray being associated with a first pixel of the image, and passing through a first scene region represented by the first pixel, the second ray being associated with a second pixel of the image, and passing through a second scene region represented by the second pixel;
a second processor for using the virtual viewpoint, the first ray, the first pixel, and second information to determine a first estimated location within the projection, the first estimated location corresponding to the first pixel, and the second information comprising information regarding a statistical distribution associated with at least one depth value of the scene;
a third processor for using the virtual viewpoint, the second ray, the second pixel, and the second information to determine a second estimated location within the projection, the second estimated location corresponding to the second pixel; and
a fourth processor for using the first and second estimated locations and the image to generate the projection.

25. An apparatus according to claim 22, wherein the at least one geometrical characteristic of the imaging system comprises one of:
a spherical reflector characteristic;
a hyperbolic reflector characteristic; and
a parabolic reflector characteristic.

26. An apparatus according to claim 22, wherein the projection is a perspective projection.

27. A computer-readable medium having a set of instructions operable to direct a processor to perform the steps of:
receiving an image generated by an image-sensing system having a plurality of viewpoints, the image being generated based upon radiation rays received by the image-sensing system, the radiation rays coming from a scene;
using first information for selecting a virtual viewpoint for a projection representing the scene, the first information comprising information regarding a statistical distribution associated with at least one depth value of the scene, the virtual viewpoint being selected for reducing distortion of the projection; and
using the image, the virtual viewpoint, and second information to generate the projection, the second information comprising information regarding at least one geometrical characteristic of the image-sensing system.

28. A computer-readable medium according to claim 27, wherein the set of instructions further directs the processor to use the first information to generate the projection.

29. A computer-readable medium according to claim 27, wherein the set of instructions further directs the processor to use the second information to select the virtual viewpoint.

30. A computer-readable medium according to claim 29, wherein the step of using the image, the virtual viewpoint, and the second information comprises:
using the second information to determine a portion of a ray surface of the image-sensing system, the portion of the ray surface having first and second ray surface points, the first ray surface point being associated with a first pixel of the image, and being further associated with a first ray passing through a first scene region represented by the first pixel, the first ray further passing through the first ray surface point, the second ray surface point being associated with a second pixel of the image, and being further associated with a second ray passing through a second scene region represented by the second pixel, the second ray further passing through the second ray surface point;
using the virtual viewpoint, the first ray, the first pixel, and the first information to determine a first estimated location within the projection, the first estimated location corresponding to a location of the first scene region;
using the virtual viewpoint, the second ray, the second pixel, and the first information to determine a second estimated location within the projection, the second estimated location corresponding to a location of the second scene region, wherein the virtual viewpoint is selected for minimizing respective uncertainties of the first and second estimated locations, each one of the respective uncertainties representing one of: (a) a respective maximum size of first and second image regions within the projection, the first and second image regions corresponding respectively to the first and second scene regions, the first image region comprising a set of possible locations of the first estimated location, the second image region comprising a set of possible locations of the second estimated location, (b) a respective mean size of the first and second image regions, and (c) a total size of the first and second image regions; and
using the first and second estimated locations and the image to generate the projection.

31. A computer-readable medium according to claim 27, wherein the at least one geometrical characteristic of the imaging system comprises one of:
a spherical reflector characteristic;
a hyperbolic reflector characteristic; and
a parabolic reflector characteristic.

32. A computer-readable medium according to claim 27, wherein the projection is a perspective projection.

33. A computer-readable medium according to claim 27, wherein the projection represents a first portion of the scene, and the virtual viewpoint is also for a further projection representing a second portion of the scene, the virtual viewpoint being further selected for reducing distortion of the further projection, and the set of instructions further directing the processor to use the image, the virtual viewpoint, and the second information to generate the further projection.

34. A computer-readable medium according to claim 27, wherein the image-sensing system comprises at least two cameras.

35. A computer-readable medium having a set of instructions operable to direct a processor to perform the steps of:
- receiving an image generated by an image-sensing system having a plurality of viewpoints, the image being generated based upon radiation rays received by the image-sensing system, the radiation rays coming from a scene;
- using first information to determine a portion of a caustic of the image-sensing system, the first information comprising information regarding at least one geometrical characteristic of the image-sensing system;
- determining an average location of the portion of the caustic;
- selecting the average location as a first virtual viewpoint for a projection representing the scene; and
- using the image, the first virtual viewpoint, and the first information for generating the projection.

36. A computer-readable medium according to claim 35, wherein the set of instructions further directs the processor to use second information to perform an adjustment of the first virtual viewpoint, for generating a second virtual viewpoint for a further projection representing the scene, the second information comprising information regarding a distribution associated with at least one depth value of the scene, the projection having a first amount of distortion, the further projection having a second amount of distortion, and the first amount of distortion being greater than the second amount of distortion.

37. A computer-readable medium according to claim 35, wherein the step of using the image, the first virtual viewpoint, and the first information comprises:
- using the image and the first information to determine first and second rays, the first ray being associated with a first pixel of the image, and passing through a first scene region represented by the first pixel, the second ray being associated with a second pixel of the image, and passing through a second scene region represented by the second pixel;
- using the virtual viewpoint, the first ray, the first pixel, and second information to determine a first estimated location within the projection, the first estimated location corresponding to the first pixel, and the second information comprising information regarding a statistical distribution associated with at least one depth value of the scene;
- using the virtual viewpoint, the second ray, the second pixel, and the second information to determine a second estimated location within the projection, the second estimated location corresponding to the second pixel; and
- using the first and second estimated locations and the image to generate the projection.

38. A computer-readable medium according to claim 35, wherein the at least one geometrical characteristic of the imaging system comprises one of:
- a spherical reflector characteristic;
- a hyperbolic reflector characteristic; and
- a parabolic reflector characteristic.

39. A computer-readable medium according to claim 35, wherein the projection is a perspective projection.

* * * * *